US012607962B2

(12) United States Patent
de Echaniz

(10) Patent No.: US 12,607,962 B2
(45) Date of Patent: Apr. 21, 2026

(54) METHOD OF CALIBRATING A HOLOGRAPHIC PROJECTOR

(71) Applicant: Envisics Ltd, Milton Keynes (GB)

(72) Inventor: Sebastian R. de Echaniz, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 225 days.

(21) Appl. No.: 18/528,693

(22) Filed: Dec. 4, 2023

(65) Prior Publication Data

US 2024/0264565 A1      Aug. 8, 2024

(30) Foreign Application Priority Data

Feb. 2, 2023      (GB) ..................................... 2301492

(51) Int. Cl.
G03H 1/22 (2006.01)

(52) U.S. Cl.
CPC ......... G03H 1/2294 (2013.01); G03H 1/2286 (2013.01)

(58) Field of Classification Search
CPC .. G03H 1/2294; G03H 1/2286; G03H 1/2202; G03H 2001/0816; G03H 2001/2207; G03H 2001/2247; G03H 1/0808; G03H 1/22; G03H 1/26; G03H 2001/266; G03H 1/02; G02B 27/0103; G02B 27/017
See application file for complete search history.

(56) References Cited

U.S. PATENT DOCUMENTS

2021/0191320 A1 *    6/2021    Bledowski ........... G03H 1/2294

FOREIGN PATENT DOCUMENTS

EP          3 951 511 A1      2/2022

OTHER PUBLICATIONS

Search Report issued on Aug. 7, 2023 in UK Application GB 2301492.1 (4 pages).
Kopylow C. et al., "Active modification of reconstructed wavefronts in application of digital comparative holography," 3DTV Conference 2007 (4 pages).

(Continued)

*Primary Examiner* — Thanh Luu
*Assistant Examiner* — Mai Thi Ngoc Tran
(74) *Attorney, Agent, or Firm* — Akerman LLP

(57)          ABSTRACT

There is provided a method of calibrating a holographic projector. The method comprises displaying a primary diffractive pattern on a display device, wherein the primary diffractive pattern comprises a first hologram of a first target image and a phase-ramp function. The method further comprises illuminating the primary diffractive pattern to form a first holographic reconstruction of the first target image on a replay plane. The first target image comprises a picture area and a non-picture area. The phase-ramp function is arranged to translate the first holographic reconstruction. The method further comprises blocking at least a portion of the first holographic reconstruction using a mask, wherein the mask is arranged to block the non-picture area in the absence of the phase-ramp function. The method further comprises measuring a property of a boundary between the picture area and the non-picture area. There is further provided a holographic projection system.

20 Claims, 12 Drawing Sheets

(56) References Cited

OTHER PUBLICATIONS

Extended European Search Report issued on Jun. 5, 2024 in EP Application 23214536.7 (10 pages).

Zaperty, Weroniki et al., "RGB imaging volumes alignment method for color holographic displays," Proceedings of SPIE, vol. 10031, pp. 1003117-1 through 1003117-8, published Sep. 28, 2016 (8 pages).

Notice of Reasons for Refusal issued on Dec. 2, 2024 in JP Application 2023-205302 (5 pages).

* cited by examiner 306
307
305
304
303
301

METHOD OF CALIBRATING A HOLOGRAPHIC PROJECTOR

CROSS-REFERENCE TO RELATED APPLICATIONS

This application claims priority under 35 U.S.C. § 119 to UK Patent Application GB 2301492.1 titled "A Method of Calibrating a Holographic Projector," filed on Feb. 2, 2023, and currently pending. The entire contents of GB 2301492.1 are incorporated by reference herein for all purposes.

FIELD

The present disclosure relates to a method of calibrating a holographic projector. More specifically, the present disclosure relates to a method of calibrating a holographic projector to compensate for rotational misalignments of the holographic projector. Some embodiments of the method relate to measuring an feature on a holographic reconstruction formed on a replay plane by the holographic projector. Some embodiments of the method relate to the use of a phase-ramp function to translate the holographic reconstruction to bring a boundary between a picture area and a non-picture area of the holographic reconstruction into view. Some examples relate to a holographic projection system and a head-up display comprising the holographic projector.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

In general terms, there is provided a holographic projector and a method of calibrating a holographic projector. In particular, there is provided a method of calibration which compensates for rotational misalignments of parts or components of the holographic projector.

A holographic projector may be arranged to form a holographic reconstruction of a target image on a replay plane. Rotational misalignments in parts or components of holographic projector may result in the holographic reconstruction being rotated. For example, the holographic projector may comprise a display device such as a spatial light modulator. The holographic projector may additionally comprise a light source, such as a laser, arranged to illuminate the spatial light modulator. The holographic projector may additionally comprise one or more optical components such as one or more lenses or mirrors. The holographic reconstruction may be formed by illuminating a diffractive structure displayed on the display device using the light source and using the one or more optical components. Misalignments in any or each of the parts or components of the holographic projector (e.g. the display device, light source and/or one or more optical components) may result in a misalignment/rotation of the holographic reconstruction relative to its intended position. These misalignments may arise, for example, due to manufacturing tolerances in the assembly of the holographic projector.

It is generally undesirable for the holographic reconstruction to be unintentionally rotated (i.e. misaligned) and so there is a need to calibrate the holographic projector to compensate for the above described (rotational) misalignments. The holographic reconstruction may comprise a picture area. The holographic projector may be arranged such that the picture area is viewable by a user. It is undesirable for the picture area to be rotationally misaligned. In some examples, the viewable picture area may be defined by a mask such as a software mask. The (software) mask may comprise an active area. In the active area, picture content may be viewable by a user. Outside of the active area, the (software) mask may place content which is not intended to be viewable by a user. The (software) mask may be referred to herein as a "layout" mask. In some examples, the holographic projector further comprises a physical mask. The layout mask may be intended to be aligned with an aperture or opening of the physical mask. However, a rotational misalignment of the holographic projector may result in a mismatch between the physical mask and the layout mask.

Furthermore, the holographic reconstruction may comprise features or areas that are used in control processes. For example, the holographic reconstruction may comprise one or more non-picture areas. The non-picture area(s) may comprise one or more control areas which may be intended to be detected by a detector/sensor and may not be intended to be viewable by a user during use of the holographic projector. For example, in one control process, the brightness of one or more control areas may be measured. This brightness measurement may be used in a feedback process to control the brightness of the holographic reconstruction (in particular, the brightness of the picture area of the holographic projection). If the holographic reconstruction is misaligned, then the features or areas (such as the non-picture areas) of the holographic reconstruction may not be properly aligned with the detector/sensor and so measurements (for example, brightness measurements) of said features or areas may not be accurate.

The above described holographic reconstruction comprises a light source arranged to illuminate a display device such as a spatial light modulator. The light source may comprise light of substantially a single (first) wavelength and so the holographic reconstruction associated with that (first) light source may be a single colour corresponding to the first wavelength. In other words, the light source may be a monochromatic light source. A full colour holographic projector may be formed by combining a plurality of single colour/monochromatic holographic projector channels. Each projection channel may comprise a display device arrayed to display holograms and a monochromatic light source. In some embodiments, an approach known as spatially-separated colours, "SSC", is used to provide colour holographic reconstruction. The method of SSC uses three spatially-separated arrays of light-modulating pixels for the three single-colour holograms. In some embodiments, three spatially separate display devices may be provided, one associated with each single-colour hologram. In other embodiments, three spatially separated areas on a single display device (spatial light modulator) may be used to provide the three arrays of light-modulating pixels. In other embodiments, an approach known as frame sequential colour, "FSC", is used to provide colour holographic reconstruction. The method of FSC can use all pixels of a common display device (spatial light modulator) to display the three single-colour holograms in sequence. The single-colour reconstructions are cycled (e.g. red, green, blue, red, green, blue, etc.) fast enough such that a human viewer perceives a polychromatic image from integration of the three single-colour images. In either SSC or FSC, a colour holographic reconstruction is created as the superposition of a three monochromatic holographic reconstructions (the superposition of FSC is separated in time). Notably, each single colour holographic reconstruction is formed by an independent light channel comprising, at least, an independent (monochromatic) light source and, optionally, one or more other components such as optical components and even a unique display device. This presents complex alignment issues. One alignment issue, as described in the preceding paragraphs, is that rotational misalignments in the parts/components of the holographic projector may cause rotational misalignment of one or more of the (monochromatic) holographic reconstructions with respect to one or more of the other (monochromatic) holographic reconstructions. For example, a light source of one of the holographic channels may be rotationally misaligned while the light sources of the other two holographic channels may be correctly aligned. Thus, one of the holographic reconstructions may be rotationally misaligned with the other two holographic reconstructions.

Rotational misalignments of individual holographic channels may adversely affect the quality of the full colour holographic reconstructions. Each single colour holographic reconstruction may comprise a plurality of pixels. Ideally, corresponding pixels of each single colour holographic reconstruction are substantially aligned to give the effect of a full colour holographic reconstruction. Rotational misalignments of holographic channels can result in pixels of one colour being misaligned with pixels of another colour which can significantly degrade perceived holographic reconstruction quality. This can be a problem both for picture areas (the perceived picture by the user may be significantly degraded) and for non-picture areas (control processes associated with the non-picture areas may be adversely effected by the misalignment of pixels).

A method for aligning the pixels of different hologram channels has previously been proposed and is described in UK Patent GB2587245. This method is referred to herein is multi-colour pixel alignment (MPA). In one example, the MPA method comprises:

forming a first holographic reconstruction of a plurality of pixels on a display plane using a first holographic projection channel, wherein the first holographic projection channel comprises a first spatial light modulator arranged to display holograms;

forming a second holographic reconstruction of the plurality of pixels on the display plane using a second holographic projection channel, wherein the second holographic projection channel comprises a second spatial light modulator arranged to display the holograms combined with at least one grating function, wherein each grating function has a respective displacement direction;

capturing images of the display plane; and for each pixel, determining a grating angle of each grating function required to align, in the respective displacement direction, the pixel of the first holographic reconstruction with the corresponding pixel of the second holographic reconstruction in order to obtain, for each displacement direction, a plurality of grating angles at a respective plurality of different locations on the display plane.

MPA is effective at compensating/correcting for translational misalignment of individual pixels within the holographic reconstruction itself (in particular, a picture area of the holographic reconstruction itself) and achieves this using grating functions to shift/align the pixels within the picture area. However, MPA is not so effective at compensating for rotational misalignments of the holographic reconstruction as a whole. For example, the holographic reconstruction may comprise a picture area and one or more non-picture area which may not overlap the picture area and, as above, may be used in a control process. MPA may be used to align corresponding pixels of different colours in the picture area using diffraction gratings or phase-ramp functions to translate the individual pixels with the picture area by imaging the picture area and applying corresponding grating functions. But the rotation of the holographic reconstructions per se may remain rotationally misaligned. This can be a particular problem for the non-picture area of the holographic reconstructions where the position of control area(s) of the non-picture area with respect to an associated detector may be critical for the detector to accurately measure properties of the non-picture areas in order to correctly perform a control process (such as a brightness control process). MPA is less effective for correcting for such rotational misalignments.

Currently, the rotational misalignments of the holographic reconstruction in the holographic projector are corrected by physically moving each component/part of the holographic projector in turn to ensure that the holographic reconstruction is rotationally aligned. In other words, the misalignments are corrected by manually aligning the hardware of the holographic projector. If the holographic projector comprises multiple channels, each channel must be correctly aligned. Such current approaches are time consuming and require expensive equipment to perform the alignment. Furthermore, there is typically a complex interdependence between the various components/parts of the holographic projector such that the effect of moving one component on the rotation of the holographic reconstruction may be difficult to predict. Furthermore, such approaches generally need to be performed at the time of manufacturing the holographic projector and so increase the manufacturing time.

There is a need for a fast and inexpensive method of calibrating/correcting for rotational misalignments of components/parts of a holographic projector that cause rotational misalignments of the holographic reconstruction. There is a need for such a method that corrects for the rotational misalignment of the holographic reconstruction as a whole and a method which does not adversely affect the manufacturing process/manufacturing time of the holographic project.

According to a first aspect of the disclosure there is provided a method of calibrating a holographic projector. The method comprises displaying a primary diffractive pattern on a display device. The primary diffractive pattern comprises a first hologram of a first target image and a phase-ramp function. The method further comprises illuminating the primary diffractive pattern to form a holographic reconstruction of the first target image on a replay plane. The first target image comprises a picture area and a non-picture area. Thus, the first holographic reconstruction (of the first target image) also comprises a picture area and a non-picture area. The phase-ramp function is arranged to translate the first holographic reconstruction. The method further comprises blocking at least a portion of the first holographic reconstruction using a mask. The mask may be a physical mask. The method further comprises measuring a property of a boundary between the picture area and the non-picture area. In particular, the method may further comprise measuring an angle between the boundary (between the picture area and the non-picture area) and an expected position of the boundary (the expected position corresponding to the position of boundary when the holographic projector is correctly aligned). The boundary between the picture area and the non-picture may be defined by the software or layout mask, described above.

During normal operation of the holographic projector (e.g. not during a calibration method), the diffractive pattern on the display device may not comprise the phase-ramp function. The mask is arranged such that, in the absence of the phase-ramp function (i.e. during normal operation), at least a portion of (optionally, all of) the non-picture area of the holographic reconstruction is blocked by the mask. Thus, during normal use of the holographic projector, the mask allows light of the picture area to be relayed onwards (for example, to a viewing system) but may block some, preferably all, of the light of the non-picture areas of the (first) holographic reconstruction. The non-picture area may comprise areas of noise. Thus, the boundary between the picture area and the non-picture area may be a boundary between the picture area and noise. The boundary may be referred to as a noise border. The non-picture area of the holographic reconstruction may additionally comprise one or more control areas such as one or more power spots. During normal use of the holographic projector it is not desirable for a viewing system (such as the eye of a person) to receive light from the non-picture areas. This may prevent the user from receiving noise and, optionally, control light. During normal use of the holographic projector, the mask (which, as above, may be a physical mask) advantageously prevents the viewing system from receiving light from the noise areas or the control areas.

As above, in the first holographic reconstruction formed at the replay plane, there is a (noise) boundary between the picture area and the non-picture area. The inventors have recognised that it is convenient to utilise this (noise) boundary to calibrate for rotational misalignments of the holographic projector (and so calibrate for rotational misalignments of the holographic reconstruction). In particular, the inventors have recognised that the (noise) boundary of the picture area has well defined expected positional properties. For example, if the holographic projector is correctly aligned, it may be expected that a lower and/or upper edge of the boundary between the picture area and the non-picture area may be a straight line and may be parallel to true horizontal. It may alternatively or additionally be expected that a left and/or right edge of the boundary between the picture area and the non-picture area may be a straight line and may be parallel to true vertical. The inventors have recognised that the boundary/edges of the picture area is/are feature that can conveniently and reliably be measured, in particular an angle of the respective boundary/edge with respect to its expected position (when the projector is properly aligned) can be measured to quantify a rotational misalignment of the holographic reconstruction.

In normal use of the holographic projector, the (noise) boundary between the picture area and the non-picture area is not visible to the end user. In particular, if the (noise) boundary is visible, then this may mean that a portion of the non-picture region is also visible which is undesirable because the non-picture region may comprise noise (as above). Normally, the actual boundary of the area viewed by a viewing system may be defined by the mask (e.g. physical mask) rather than the picture/non-picture area boundary in the holographic reconstruction itself. The inventors have recognised that the (noise) boundary in the holographic reconstruction can be made visible simply by including a phase-ramp function in the diffractive pattern to translate the holographic reconstruction from its usual position (where it may be blocked by the mask) to a translated position in which the boundary between the picture area and the non-picture area becomes visible beyond the mask. Because of the prejudice against the boundary in the holographic reconstruction being visible, it is highly unusual and counterintuitive for the inventors to have devised a new mode of operation of the holographic projector in which a phase-ramp function is used to bring the boundary into view (temporarily for calibration purposes). In other words, a (simple) phase-ramp function can be displayed (in addition to the hologram of the picture) to expose the straight-edge (noise) boundary. The straight-edge (noise) boundary is a feature with well defined properties that can be used in a rotational alignment operation with minimal processing requirements. Furthermore, the method can be applied to any hologram (of any target image). Unlike in some known alignment methods, the method according to the present disclosure does not require the calculation of a specific alignment hologram.

As described previously, current methods of calibrating for rotational misalignments typically require manual (physical) interventions in which individual parts or components of the holographic projector are adjusted individually. This is a slow process which typically must take place on a manufacturing line. An advantage of the calibration method proposed by the inventors in the present disclosure is that the method advantageously can be performed entirely in software (unlike the previous methods of physical adjustment). In particular, each of the steps of: displaying a phase-ramp function to shift/translate the boundary of the picture area into view; forming a holographic reconstruction of any target image; and measuring a property of the boundary can be computer-implemented. There is no need for physical adjustments of components or parts of the holographic projector to correct any misalignments (e.g. to align the display device or light source or other optical components). Instead, based on the measured property of the boundary between the picture area and the non-picture area, the method may further comprise inferring/determining/measuring a rotational misalignment of the first holographic reconstruction of the first target image. The inventors have found it convenient to use the phase-mask to translate the boundary to be visible (e.g. exposed from behind a masked area) to determine the rotational misalignment of the holographic reconstruction of the target image. Advantageously, the hologram of the target image may be altered (based upon the determined rotational misalignment) to compensate for the rotational misalignment such that the holographic reconstruction of the target image appears as intended (without rotational misalignment). As will be appreciated by the skilled person, the adjustments can be implemented in software (e.g. as part of the hologram calculation method). There is no need for a physical intervention in which the components/parts (e.g. mirrors or lenses) of the holographic projector are manually adjusted. The method of calibration is therefore much faster than current conventional rotation alignment methods (as mentioned above) and does not require specialist (expensive) equipment. Furthermore, the calibration can be performed away from the production line and so the calibration step does not slow the manufacturing process. Furthermore, the calibration may be performed at any point in time. For example, over time, the alignment of the components of the holographic projector may change. This may be due to vibrations or knocks on the holographic projector or due to environmental factors such as temperature changes, for example. The calibration method according to the disclosure can be performed at any time to compensate for changing rotational alignment. For example, the calibration method could be performed at a regular interval or prior to each use of the holographic projector. The calibration method can be performed with the holographic projector in situ. For example, the holographic projector may be part of a head-up display in a vehicle. The calibration method may be performed while the holographic projector is in place within the dashboard (for example) of a vehicle. The method may be part of an end-of-line calibration process.

The boundary may be a straight-line boundary. The boundary may comprise one or more edges, such as one or more straight edges. The step of measuring a property of the boundary may comprise measuring a property or characteristic of the straight-line of the boundary, such as measuring an angle of a straight edge of the boundary relative to the horizontal. The mask may be a physical mask—e.g. such as a baffle to reduce stray light. A mask is typically positioned substantially on the holographic replay plane. The mask may comprise one or more areas/openings/openings arranged to allow the passage of light therethrough such as image-forming light of the HUD, and/or block undesired light such as stray light.

The holographic reconstruction is a holographic reconstruction of the target image. In accordance with embodiments, the target image comprises a picture area and (at least one) non-picture area, and therefore the holographic reconstruction thereof comprises corresponding picture and non-picture areas. The holographic reconstruction is formed at a replay field. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. Each diffracted order comprises a replica of the holographic reconstruction (and so comprises a replica of the picture area and non-picture area or areas).

As above, the holographic reconstruction comprises a picture area and a non-picture area, the non-picture area comprising noise. A noise border may separate the picture area and the non-picture area. The first hologram may be computer-generated hologram. The first hologram may have been calculated such that the first holographic reconstruction comprises the pictures area and non-picture area, as described. The first hologram may have been calculated using an iterative method. For example, the first hologram may have been calculated using Gerchberg-Saxton type method. The first hologram may have been calculated using an iterative method which intentionally results in the holographic reconstruction comprising the picture and the non-picture area (noise area), as described.

Throughout this disclosure, reference is made to translation and rotation of the holographic reconstruction. An alternative way of describing this could be to describe a translation and/or rotation of the holographic replay field such as the zero-order or primary holographic replay field or the plurality of replay fields formed by diffraction. A translation of the replay field may be achieved as a result of a phase-ramp function combined with (e.g. added to) a hologram. The replay field may be referred to as rotationally misaligned as a result of optic components of the holographic projector (as described above). The rotational misalignment of the replay field may be corrected by modifying the first hologram. Alternatively, the rotational misalignment of the replay field may be corrected by displaying a rotational function on display device. For example, a diffractive pattern may by displayed comprising a hologram of a target image and a rotational function. The holographic reconstruction of the diffractive pattern may then by a reconstruction of the target image (of the hologram) but rotated in accordance with the rotational function. In some embodiments, the rotational function may be a matrix function. Thus, references to the holographic reconstruction throughout this disclosure could generally be replaced with references to the (holographic) replay field.

As used herein, the "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels". The rotation and/or translation of the holographic reconstruction may preferably be a rotation or translation on the plane of the replay plane.

As will be understood by the skilled person, a phase-ramp (or grating) function is a function which may be displayed on the display device to displace the spatially modulated light by a predetermined amount in a first direction on the replay plane. Phase-ramp (or grating) functions can be calculated to provide a range of displacements with high accuracy—even sub-pixel accuracy. The displacement may be a linear displacement in a first direction. The first direction may be a vertical or a horizontal direction. Reference is made throughout this disclosure to a "phase-ramp" (or "grating function") by way of example only of a function (e.g. array of phase or phase-delay values) that provides a linear translation of the holographic reconstruction on the replay plane. That is, an array of light modulation values which, when added to the hologram, linearly displaces the replay field by a defined magnitude and direction. The displacement may be measured in pixels, millimetres or degrees. The phase-ramp may also be referred to as a phase-wedge. The phase values of the phase-ramp may be wrapped (e.g. modulo $2\pi$). A wrapped phase-ramp may be considered a phase grating. However, the present disclosure is not limited to phase-only modulation and the terms "grating function", "software grating" and "blazed grating" may be used as examples of a beam steering function such as a wrapped modulation ramp. A phase-ramp may be characterised by its phase gradient. The term "grating function" is preferred in the present disclosure because the associated grating angle is a key component of the method disclosed.

The phase-ramp function may be arranged to translate the holographic reconstruction (or replay field) from a first position to a second position. The translation may be along a linear axis. The first position may be a position of the holographic reconstruction (or replay field) in the absence of the phase-ramp function. In other words, the first position may correspond to a position of the holographic reconstruction when a diffractive pattern comprising the first hologram, but not comprising the phase-ramp function, is displayed on the display device. The second position may be a position of the holographic reconstruction when the first diffractive pattern (comprising the first hologram and the phase-ramp function) is displayed on the display device. Thus, the step of illuminating the first diffractive pattern (comprising the first hologram and the phase ramp) may comprise forming a holographic reconstruction of the target image at the second position.

The mask is arranged to block the non-picture area in the absence of the phase-ramp function, in particular, in the absence of the specific phase-ramp function described above that is arranged to translate the holographic reconstruction from the first position to the second position. This may not exclude the primary diffractive pattern display from comprising other phase-ramp functions (for example, used in an MPA scheme, as described above). In other words, the mask is arranged to block the non-picture when the holographic reconstruction (or replay field) is in the first position. However, the step of blocking at least a portion of the holographic reconstruction using the mask is actually performed when the holographic reconstruction (or replay field) is in the second position (because the first diffractive structure, which is illuminated to form the first holographic reconstruction, comprises the phase-ramp function). During normal use of the holographic projector, when the holographic reconstruction is in the first position, the boundary of the picture area and the non-picture area may not be visible beyond the mask. However, during the calibration method and when the primary diffractive structure comprising the phase-ramp function is illuminated, the first holographic reconstruction is translated from the first position to the second position. In the second position, the boundary between the picture area and the non-picture area is visible beyond the mask (i.e. is not blocked or hidden or obscured by the mask).

In some embodiments, the method further comprises determining or measuring or inferring a rotational misalignment of the first holographic reconstruction of the target image based on the measured property of the (straight-line) boundary. In some embodiments, the step of determining or measuring or inferring a rotational misalignment of the first holographic reconstruction of the first target image may comprise capturing or detecting an image of the first holographic reconstruction/replay field/replay plane. In some embodiments, the method may further comprise identifying the boundary between the picture area and the non-picture area of the first holographic reconstruction in the captured image. In particular, the method may further comprise identifying a straight-line boundary between the picture area and the non-picture area in the captured image. In some embodiments, the method may further comprise measuring an angle of at least a portion of the identified (straight-line) boundary. In some embodiments, the method may comprise measuring an angle between the portion of the identified (straight-line) boundary and a predetermined target/(predetermined) image element. The predetermined target/image element may be a horizontal or vertical line. The method may comprise the step of adding or superimposing the predetermined target/image element on to the captured image, in particular on to the identified (straight-line) boundary. The method may further comprise measuring the angle between the identified boundary and the predetermined target/image element. In particular, the method may comprise superimposing the predetermined target on the captured image. The method may assume that the camera or detector is correctly aligned.

In some embodiments, the method further comprises displaying a modified primary diffractive pattern on the display device. The modified primary diffractive pattern may be arranged such that a modified first holographic reconstruction is formed when the modified primary diffractive pattern is illuminated. At least a portion of the modified first holographic reconstruction may be rotated relative to the (unmodified) first holographic reconstruction. The rotation may be such that such that a rotational misalignment of the at least portion of the modified first holographic reconstruction (corresponding to the modified first hologram) is reduced relative to the respective at least portion of the (unmodified) first holographic reconstruction. In some embodiments, the method further comprises displaying the modified first holographic reconstruction.

In some embodiments, the modified primary diffractive pattern comprises a modified first hologram. In such embodiments, the method may comprise the step of a calculating a modified first hologram may be based on the measured/determined angle/misalignment of the identified (straight-line) boundary. The modified first hologram may be calculated such that light that is spatially modulated in accordance with the modified first hologram forms a modified holographic reconstruction on the replay plane. The modified first hologram may be calculated such that the modified first holographic reconstruction is rotated relative to the unmodified first holographic reconstruction. This rotation may be such that a rotational misalignment of the modified first holographic reconstruction (corresponding to the modified first hologram) is reduced relative to the (unmodified) first holographic reconstruction.

In some embodiments, the modified first hologram is recalculated such that the entire modified first holographic reconstruction is rotated (relative to the unmodified first holographic reconstruction). In some embodiments, the modified primary diffractive pattern comprises a rotation matrix. In such embodiments, the method may comprise the step of determining or calculating the rotation matrix. The step of determining or calculating the rotation matrix may be based on the measured/determined angle/misalignment of the identified (straight-line) boundary. The rotation matrix may be calculating or determined such that the modified first holographic reconstruction is rotated relative to the unmodified first holographic reconstruction.

In other embodiments, one or more portions of the modified first holographic reconstruction are rotated (but not the reconstruction as a whole). For example, the first modified hologram may be such that picture area of the modified first holographic reconstruction is rotated relative to the picture area of the unmodified first holographic reconstruction. This may mean that the picture area is rotated relative to the non-picture area. Rotating the picture area may be equivalent to rotating the boundary between the picture area and the non-picture area. If the non-picture area comprises one or more control areas, the first modified hologram may be modified such that the one or more control areas of the first modified holographic reconstruction are rotated relative to the respective one or more control areas of the first unmodified holographic reconstruction.

As used herein, a "modified first hologram" relates to a hologram that is of substantially the same target image as the first hologram but in which the target image (as a whole) has been rotated. The "modified" nature of the "modified first hologram" means that the hologram is modified/altered/recalculated to change the rotation of the holographic reconstruction formed when the hologram is illuminated relative to the unmodified "first hologram" (to compensate for rotational misalignments of the holographic projector). Similarly, a "modified first holographic reconstruction" refers to a holographic reconstruction which is of substantially the same target image as the (unmodified) first holographic reconstruction. However, the modified first holographic reconstruction is rotated relative to the unmodified first holographic reconstruction.

In some embodiments, the method comprises masking the holographic reconstruction to block the non-picture areas.

In some embodiments, the holographic reconstruction is spatially separated from the hologram/display device. The distance between the spatially separated holographic reconstruction and hologram/display device may be referred to as a projection distance. Spatially modulated light may propagate across the projection distance from the display device (spatial light modulator) to the replay plane.

In some embodiments, the method further comprises the step of displaying a second diffractive pattern comprising the modified first hologram. The method may further comprise illuminating the second diffractive pattern to form the modified first holographic reconstruction of the target image on the replay plane.

In some embodiments, the second diffractive pattern further comprises the (or a) phase-ramp function. Thus, the modified first holographic reconstruction may be formed on the replay plane in the second (linear) position.

The method may then further comprise repeating the steps of measuring a property of the (straight-line) boundary between the picture area and the non-picture area (which is visible beyond the mask owing to the phase-ramp function) and, optionally, of determining a rotational misalignment of the holographic reconstruction of the target image based on the measured property of the (straight-line) boundary (if any) and, optionally, of calculating a modified first hologram. Repeating these steps may allow for the calibration of the holographic projector to be confirmed before the shifting the replay field back to first position. Alternatively or additionally, the calibration method may be an iterative process, with the rotational misalignment being incrementally improved for each iteration until a misalignment angle of the boundary reaches a sufficiently low threshold. In such embodiments, method may comprise displaying a diffractive pattern comprising a final modified first hologram in the absence of the phase-ramp function.

Alternatively, in some embodiments (for example, non-iterative embodiments) the second diffractive pattern does not comprise the phase-ramp function (such that the modified holographic reconstruction is formed at the first linear position).

In some embodiments, the method may comprise displaying a diffractive pattern comprising the first hologram in the absence of the phase-ramp function before displaying the first diffractive pattern (comprising both the first hologram and the phase ramp function). The method may also comprise illuminating said diffractive pattern to form the holographic reconstruction. In other words, the method may comprise forming the first holographic reconstruction in the first position before the step of forming the first holographic reconstruction in the second position.

In some embodiments, the step of illuminating the first diffractive pattern may comprise illuminating the diffractive pattern with light of a first wavelength. The first wavelength may correspond to red, green or blue light.

In some embodiments, the holographic projector may be a colour holographic projector. The holographic projector may be arranged to form holographic projections comprising a plurality of monochromatic light sources, each monochromatic light source having a different wavelength. For example, the holographic projector may comprise a first light source and may comprise illuminating a display device with light of a first wavelength. The holographic projector may comprise a second light source and may comprise illuminating a display device with light of a second wavelength (that is different to the first wavelength). The holographic projector may comprise a third light source and may comprise illuminating a display device with light of a third wavelength (that is different to the first or second wavelength). The first wavelength may be one from a group of red, green or blue light. The second wavelength may be one of the two remaining options from said group. The third wavelength may be the remaining option from said group. For each frame of content displayed, the holographic projector may be arranged to form a holographic reconstruction for each of the plurality (typically three) colours. The method may comprise performing the calibration process (discussed above in relation to a first holographic reconstruction having a first colour) to the holographic reconstruction (or reconstructions) having each of the other colours.

In some embodiments, the method may further comprise displaying a secondary diffractive pattern on a display device. The secondary diffractive pattern may comprise a second hologram of a second target image. The secondary diffractive pattern may comprise a phase-ramp function. This may be the same phase-ramp function as previously described such that the holographic reconstruction associated with the secondary diffractive pattern may have a corresponding first and second position to the holographic reconstruction of the secondary diffractive pattern.

In some embodiments, the method may further comprise illuminating the secondary diffractive pattern to form a second holographic reconstruction of the second target image on a replay plane. The second target image may comprise a picture area and a non-picture area. In some embodiments, the method may further comprise blocking at least a portion of the second holographic reconstruction using the mask (at the replay plane). The mask may be arranged to block the non-picture area in the absence of the phase-ramp function (i.e. when the second holographic reconstruction is in the first position). In some embodiments, the method further comprises measuring a property of a (straight-line) boundary between the picture area and the non-picture area of the second reconstruction. In some embodiments, the method may further comprise determining (measuring) a rotational misalignment of the second holographic reconstruction based on the measured property of the (straight-line) boundary. In some embodiments, the method may comprise calculating a modified second hologram, the modified second hologram being calculated such that light that is spatially modulated in accordance with the modified second hologram forms a modified holographic reconstruction on the replay plane, the modified second holographic reconstruction being rotated relative to the (unmodified) second holographic reconstruction.

In some embodiments, the method may further comprise displaying a tertiary diffractive pattern on a display device. The tertiary diffractive pattern may comprise a third hologram of a third target image. The tertiary diffractive pattern may comprise a phase-ramp function. This may be the same phase-ramp function as previously described such that the holographic reconstruction associated with the tertiary diffractive pattern may have a corresponding first and second position to the holographic reconstruction of the tertiary diffractive pattern.

In some embodiments, the method may further comprise illuminating the tertiary diffractive pattern to form a third holographic reconstruction of the third target image on a replay plane. The third target image may comprise a picture area and a non-picture area. In some embodiments, the method may further comprise blocking at least a portion of the third holographic reconstruction using the mask (at the replay plane). The mask may be arranged to block the non-picture area in the absence of the phase-ramp function (i.e. when the third holographic reconstruction is in the first position). In some embodiments, the method further comprises measuring a property of a (straight-line) boundary between the picture area and the non-picture area of the second reconstruction. In some embodiments, the method may further comprise determining (measuring) a rotational misalignment of the third holographic reconstruction based on the measured property of the (straight-line) boundary. In some embodiments, the method may comprise calculating a modified third hologram, the modified third hologram being calculated such that light that is spatially modulated in accordance with the modified third hologram forms a modified holographic reconstruction on the replay plane, the modified third holographic reconstruction being rotated relative to the (unmodified) second holographic reconstruction.

In a second aspect, there is provided a holographic projection system. The holographic projection system comprises a light source arranged to output light. The holographic projection system further comprises a display device. The display device is arranged to display a diffractive pattern. The diffractive pattern comprises a hologram of a target. The display device is arranged to receive light from the light source and output spatially modulated light in accordance with the diffractive pattern to form a holographic reconstruction of the target image at a replay plane. The holographic projection system further comprises a mask arranged to block at least a portion of the holographic reconstruction. The holographic projection system further comprises a camera arranged to capture an image of the holographic reconstruction. The holographic projection system further comprises a processor (or controller). The processor or controller is arranged to display a primary diffractive pattern on the display device. The primary diffractive pattern comprises a first hologram of a first target image. The first target image comprises a picture area and a non-picture area. The primary diffractive pattern further comprises a phase-ramp function arranged to translate the holographic reconstruction. The processor or controller is further arranged to capture an image of the holographic reconstruction to measure a property of a boundary between the picture area and the non-picture area. In particular, the processor or controller is arranged to capture an image of the holographic reconstruction when the holographic reconstruction is translated by the phase-ramp function. The mask is arranged to block the non-picture area in the absence of the phase-ramp function.

Features and advantages described in relation to the method of the first aspect may be applicable to the projection system of the second aspect, and vice versa.

The phase-ramp function may be arranged to translate the holographic reconstruction (or replay field) from the first position to the second position (as described in relation to the first aspect). The mask may be arranged to block the non-picture when the holographic reconstruction (or replay field) is in the first position. In the second position (i.e. when the phase-ramp function is displayed on the display device), the boundary between the picture area and the non-picture area is visible beyond the mask.

In some embodiments, the processor or controller is arranged to determine or measure or infer a rotational misalignment of the first holographic reconstruction of the target image based on the measured property of the (straight-line) boundary. In some embodiments, the processor or controller may further be arranged to identify the boundary between the picture area and the non-picture area of the first holographic reconstruction. In some embodiments, the processor or controller may further be arranged to measure an angle of at least a portion of the identified (straight-line) boundary. In some embodiments, the processor or controller may further be arranged to measure an angle between the portion of the identified (straight-line) boundary and a predetermined target/(predetermined) image element. The predetermined target/(predetermined) image element may be a straight line such as horizontal or vertical line. The processor or controller may be arranged to add or superimpose the predetermined target on to the identified (straight-line) boundary in a captured image and then measure the angle between the two.

In some embodiments, the processor or controller may further be arranged to calculate a modified first hologram. The modified first hologram may be calculated such that light that is spatially modulated in accordance with the modified first hologram forms a modified holographic reconstruction on the replay plane. The modified first hologram may be calculated such that the modified holographic reconstruction is rotated relative to the unmodified holographic reconstruction. This rotation may be such that a rotational misalignment of the modified holographic reconstruction (corresponding to the modified first hologram) is reduced relative to the (unmodified) holographic reconstruction.

In some embodiments, the holographic projector comprises a plurality of holographic channels. In some embodiments, the holographic projector is arranged to projector colour holographic reconstructions. In some embodiments, each of the plurality of holographic channels may result in the formation of a holographic reconstruction of a different colour. In some embodiments, the holographic projector may comprise a plurality of monochromatic light sources. Each of the plurality of monochromatic light sources may be arranged to emit light of a different wavelength. For example, the holographic projector may comprise a first light source arranged to emit light of a first wavelength. The holographic projector may comprise a second light source arranged to emit light of a second wavelength (that is different to the first wavelength). The holographic projector may comprise a third light source arranged to emit light of a third wavelength (that is different to the first and second wavelength). The first wavelength may be one from a group of red, green or blue light. The second wavelength may be one of the two remaining options from said group. The third wavelength may be the remaining option from said group.

In some embodiments, the controller or processor may further be arranged to display a secondary diffractive pattern on a display device. The secondary diffractive pattern may comprise a second hologram of a second target image. The secondary diffractive pattern may comprise a phase-ramp function. This may be the same phase-ramp function as previously described such that the holographic reconstruction associated with the secondary diffractive pattern may have a corresponding first and second position to the holographic reconstruction of the secondary diffractive pattern.

In some embodiments, the controller or processor may further be arranged to illuminate the secondary diffractive pattern to form a second holographic reconstruction of the second target image on a replay plane. The second target image may comprise a picture area and a non-picture area. In some embodiments, the mask may be arranged to block at least a portion of the second holographic reconstruction. The mask may be arranged to block the non-picture area in the absence of the phase-ramp function (i.e. when the second holographic reconstruction is in the first position). In some embodiments, the processor or controller further comprises measuring a property of a (straight-line) boundary between the picture area and the non-picture area of the second reconstruction. In some embodiments, the processor or controller may further comprise determining (measuring) a rotational misalignment of the second holographic reconstruction based on the measured property of the (straight-line) boundary. In some embodiments, the processor or controller may comprise calculating a modified second hologram, the modified second hologram being calculated such that light that is spatially modulated in accordance with the modified second hologram forms a modified holographic reconstruction on the replay plane, the modified second holographic reconstruction being rotated relative to the (unmodified) second holographic reconstruction.

In some embodiments, the controller or processor may further be arranged to display a tertiary diffractive pattern on a display device. The tertiary diffractive pattern may comprise a third hologram of a third target image. The tertiary diffractive pattern may comprise a phase-ramp function. This may be the same phase-ramp function as previously described such that the holographic reconstruction associated with the tertiary diffractive pattern may have a corresponding first and second position to the holographic reconstruction of the tertiary diffractive pattern.

In some embodiments, the controller or processor may further be arranged to illuminate the tertiary diffractive pattern to form a third holographic reconstruction of the third target image on a replay plane. The third target image may comprise a picture area and a non-picture area. In some embodiments, the mask may be arranged to block at least a portion of the third holographic reconstruction. The mask may be arranged to block the non-picture area in the absence of the phase-ramp function (i.e. when the third holographic reconstruction is in the first position). In some embodiments, the processor or controller further comprises measuring a property of a (straight-line) boundary between the picture area and the non-picture area of the third reconstruction. In some embodiments, the processor or controller may further comprise determining (measuring) a rotational misalignment of the third holographic reconstruction based on the measured property of the (straight-line) boundary. In some embodiments, the processor or controller may comprise calculating a modified third hologram, the modified third hologram being calculated such that light that is spatially modulated in accordance with the modified third hologram forms a modified holographic reconstruction on the replay plane, the modified third holographic reconstruction being rotated relative to the (unmodified) third holographic reconstruction.

According to a third aspect there is provided a method of calibrating a holographic projector. The method comprises displaying a primary diffractive pattern on a display device, wherein the primary diffractive pattern comprises a first hologram of a target image. The method further comprises illuminating the primary diffractive pattern to form a first holographic reconstruction of the target image on a replay plane, wherein the target image comprises a picture area and a non-picture area. The method further comprises capturing an image of at least a portion of the first display area. The method further comprises determining a first calibration feature of the first display area in the captured image. The method further comprises determining a rotational misalignment of the first display area based on a comparison between the determined first calibration feature and a target.

In some embodiments, the step of determining the rotational misalignment comprises measuring the angle between the first calibration feature and the target.

In some embodiments, the first calibration feature is a straight line in the captured image. In some embodiments, the first calibration feature is intended to be substantially horizontal or vertical straight line in the holographic reconstruction (in other words, is horizontal or vertical when the holographic reconstruction is properly aligned). In some embodiments, the straight line is a line of pixels in the picture area of the holographic reconstruction.

In some embodiments, the target is substantially linear (is a straight line). In some embodiments, the target is a horizontal or vertical line.

In some embodiments, the step of determining an (non-zero) angle between the first calibration feature and the target comprises superimposing the target on the captured image and measuring an angle between the target and the first calibration feature.

In some embodiments, the method further comprises calculating a modified first hologram. The modified first hologram may be calculated such that light that is spatially modulated in accordance with the modified first hologram forms a modified holographic reconstruction on the replay plane, the modified holographic reconstruction being rotated relative to the (unmodified) first replay plane.

Like the method of the first aspect, the method of the third aspect provides a means (in software) of calibrating/compensating for rotational misalignments of parts/components of the holographic projector. However, the method of the third aspect does not require the measurement of the boundary between the picture and the non-picture area in the calibration process. Instead, a first calibration feature may be included in the holographic reconstruction itself.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram.

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator.

Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 7A is a schematic view of a first holographic reconstruction formed by a first holographic channel;

FIG. 7B is a schematic view of a second holographic reconstruction formed by a second holographic channel;

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration of Holographic Picture Generating Unit

Figure 1:
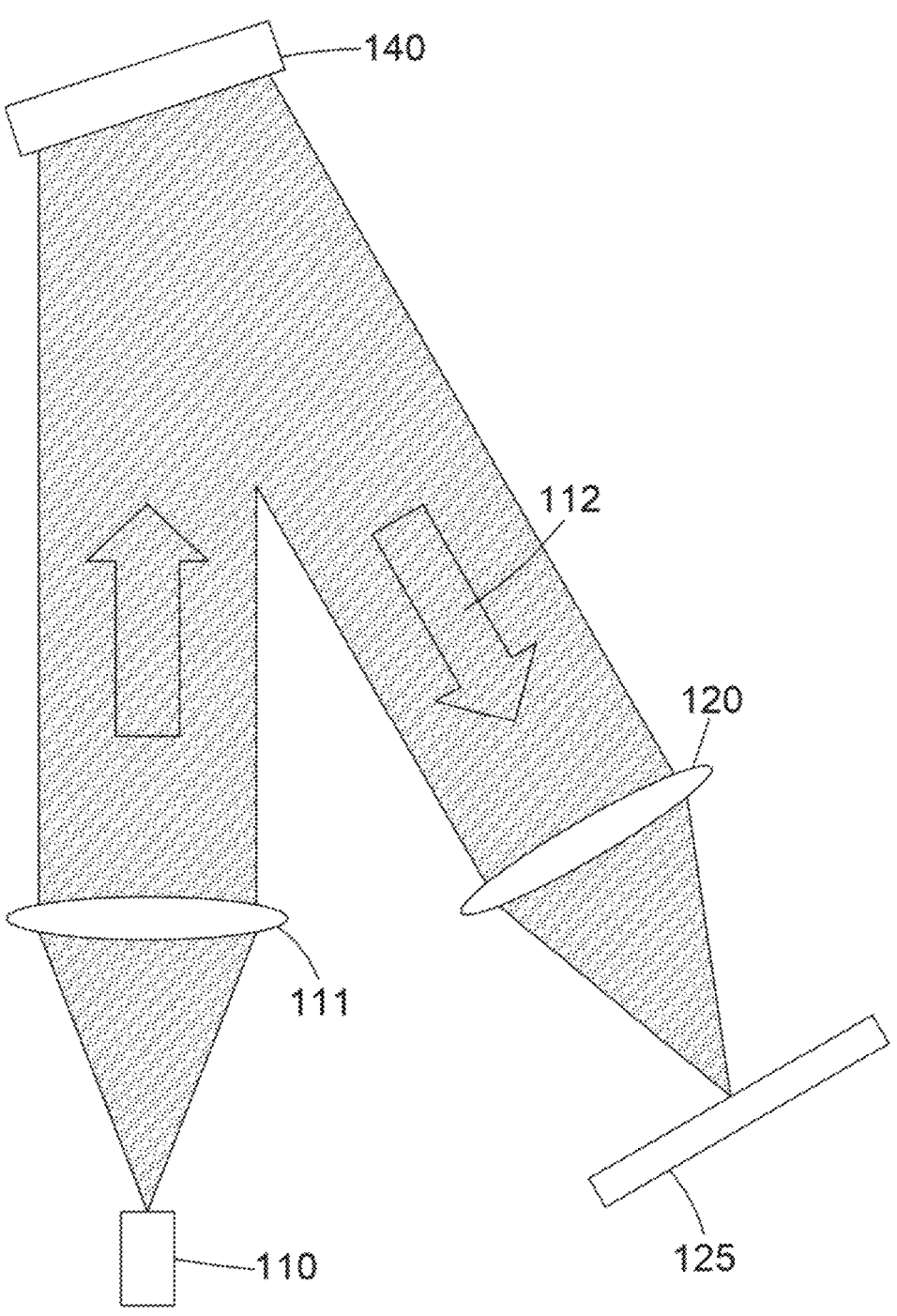
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
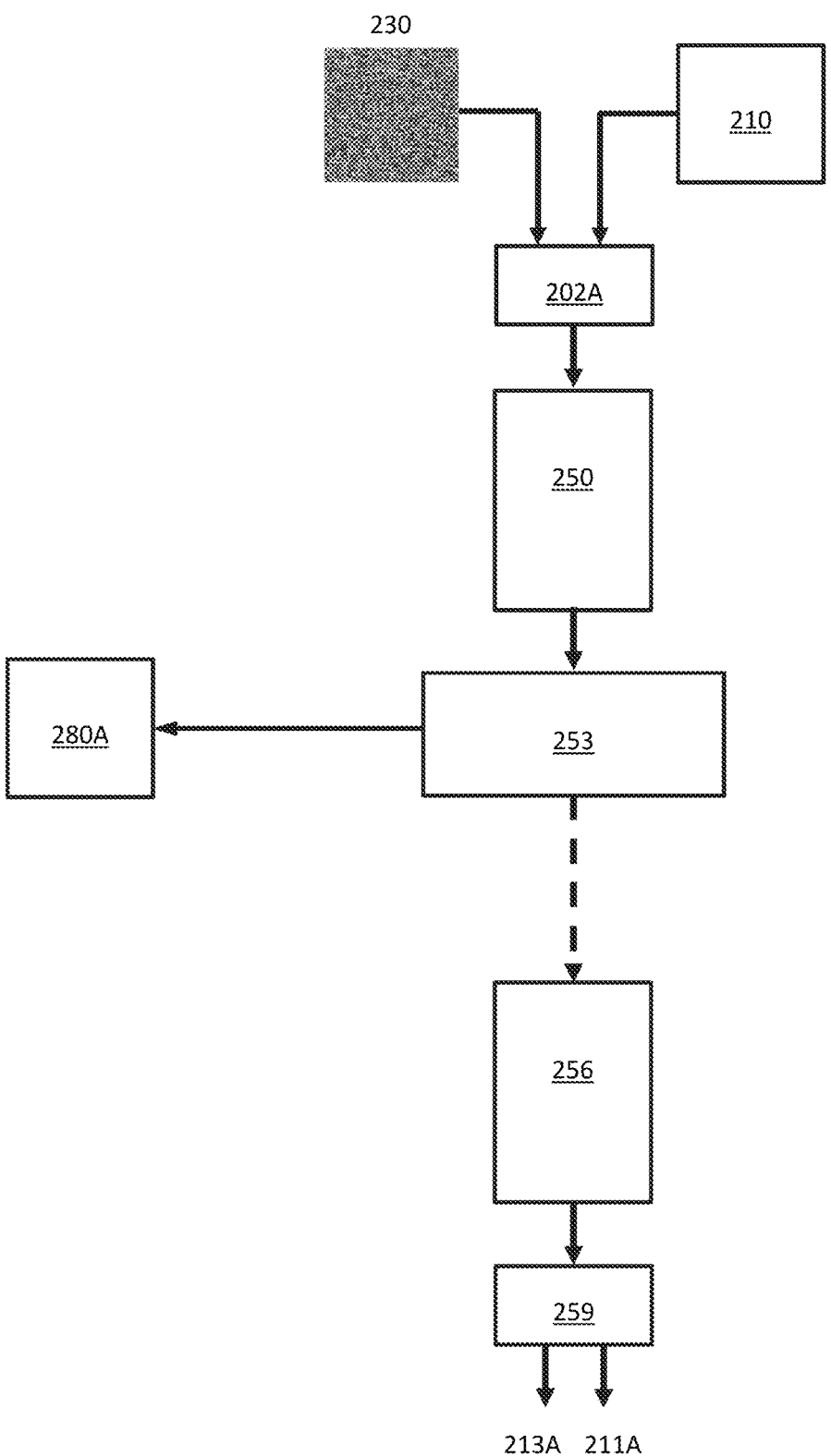
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantizes each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
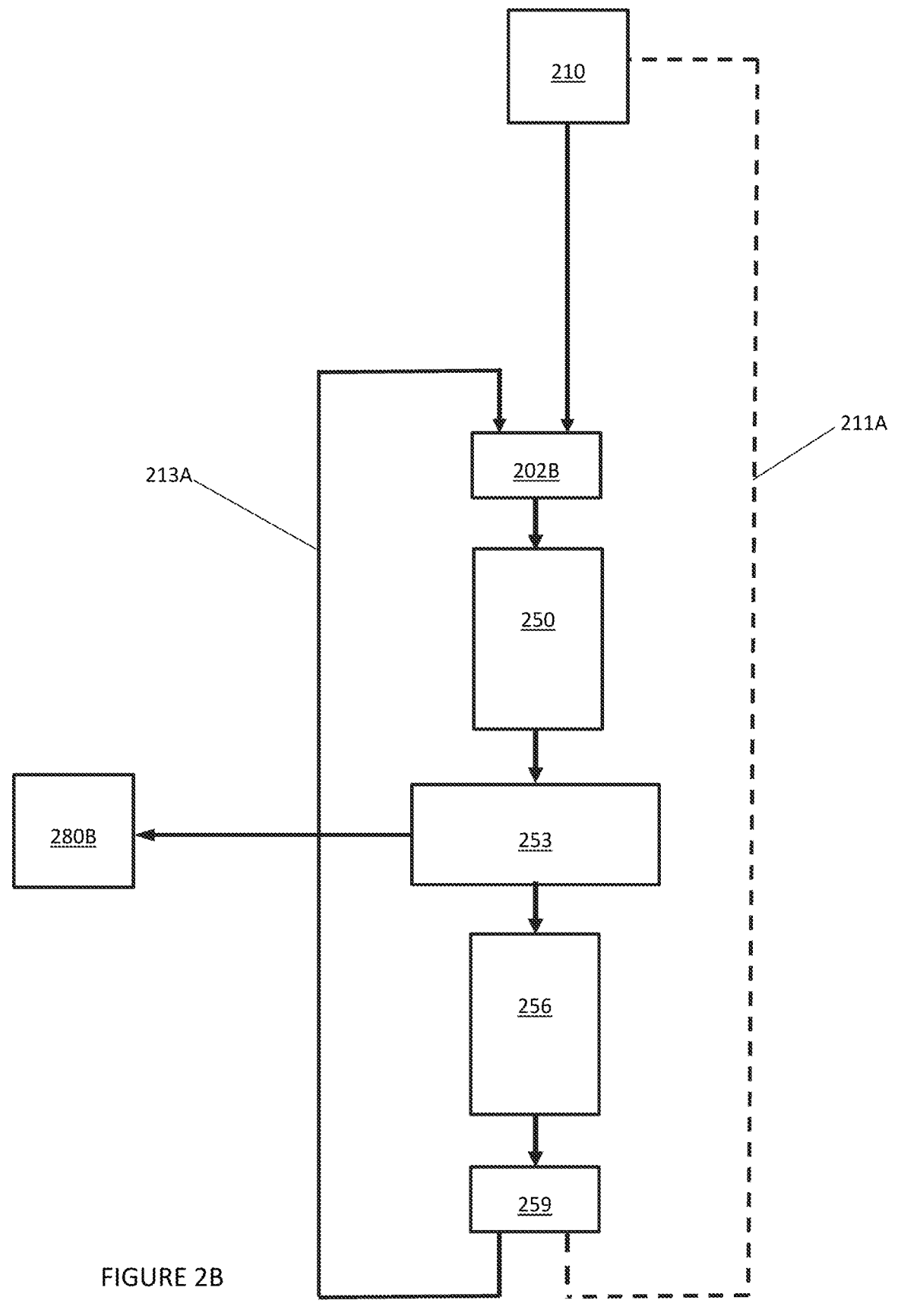
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
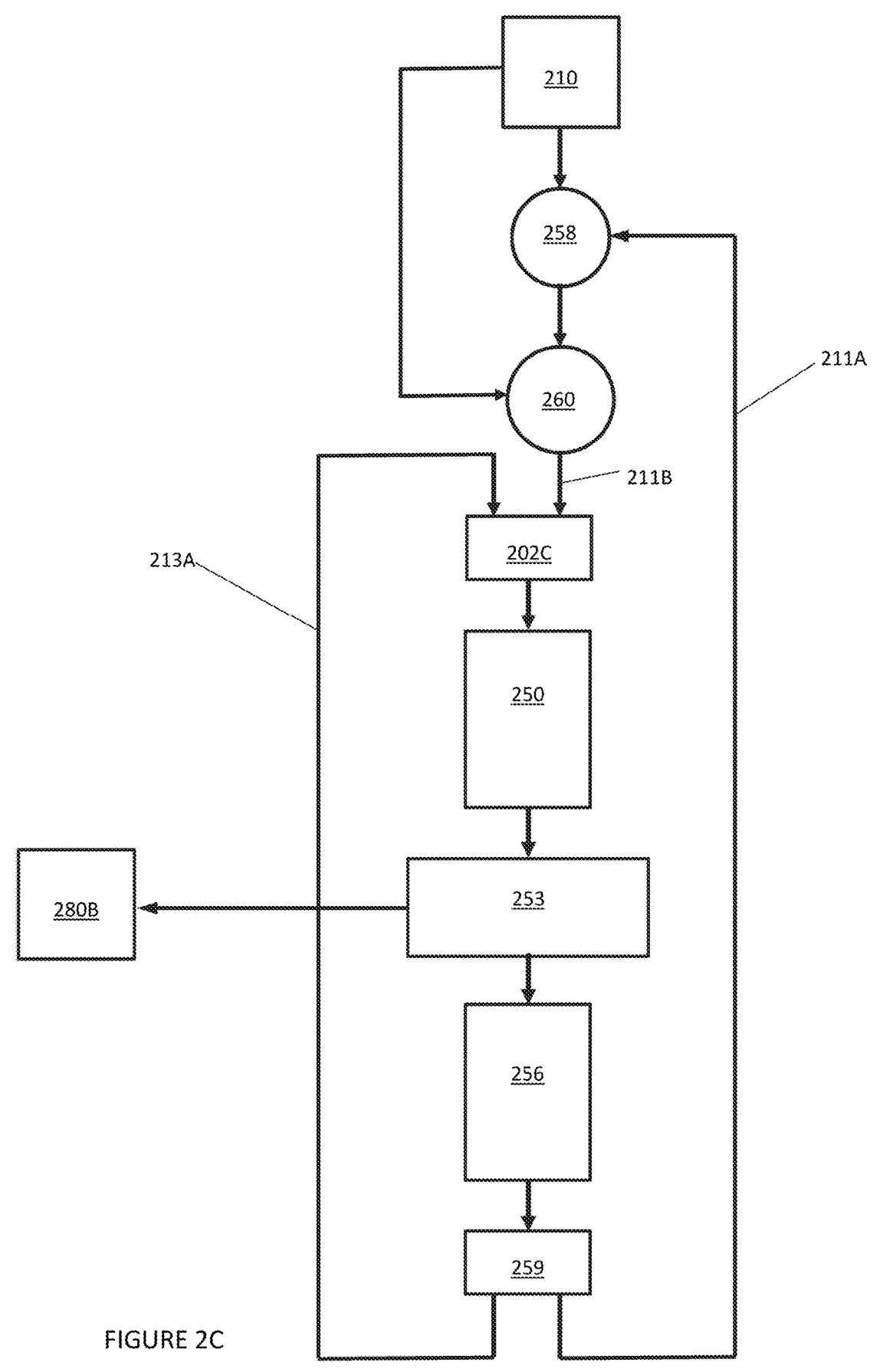
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor $\alpha$ and subtracts the scaled difference from the input image 210. This is expressed mathematically by the following equations, wherein the subscript text and numbers indicate the iteration number:

$$R_{n+1}[x, y] = F'\{\exp(i\,\psi_n[u, v])\}$$

$$\psi_n[u, v] = \angle F\{\eta \cdot \exp(i\angle R_n[x, y])\}$$

$$\eta = T[x, y] - \alpha(|R_n[x, y]| - T[x, y])$$

where:

$F'$ is the inverse Fourier transform;

$F$ is the forward Fourier transform;

$R[x, y]$ is the complex data set output by the third processing block 256;

$T[x, y]$ is the input or target image;

$\angle$ is the phase component;

$\Psi$ is the phase−only hologram 280*B*;

$\eta$ is the new distribution of magnitude values 211*B*; and $\alpha$ is the gain factor.

The gain factor $\alpha$ may be fixed or variable. In some embodiments, the gain factor E is determined based on the size and rate of the incoming target image data. In some embodiments, the gain factor $\alpha$ is dependent on the iteration number. In some embodiments, the gain factor $\alpha$ is solely function of the iteration number.

The embodiment of FIG. 2C is the same as that of FIG. 2A and FIG. 2B in all other respects. It may be said that the phase-only hologram $\Psi(u, v)$ comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens.

An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
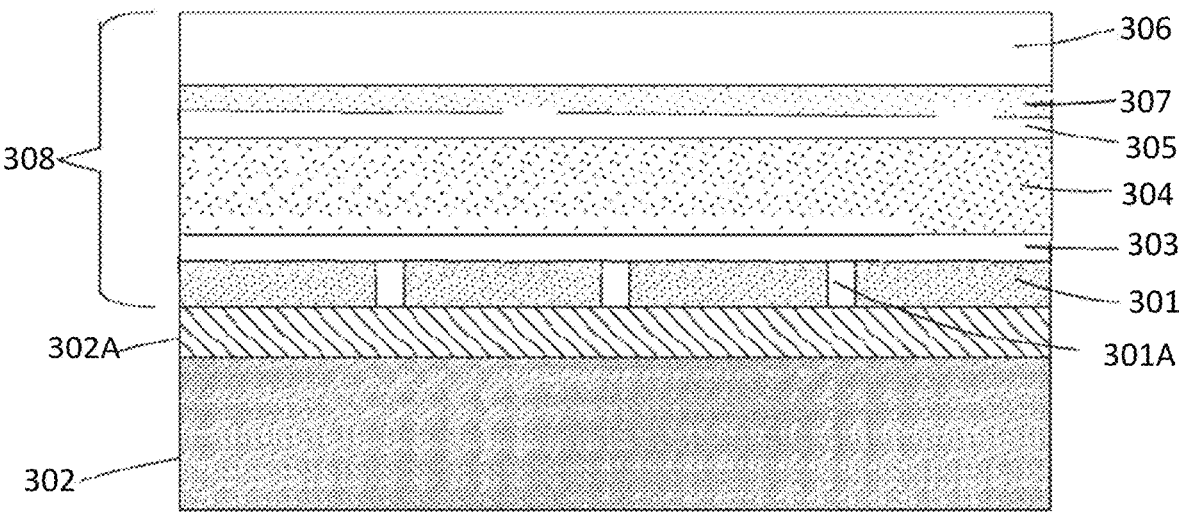
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

As described above, the principles of the present disclosure are applicable to non-holographic picture generating units as well as holographic picture generating units as described above.

Compact Head-Up Display

The picture generating unit described in relation to FIG. 1 is typically provided as part of a head-up display system (HUD-system). The HUD system further comprises an optical relay system arranged to relay light of a picture from a display area of a picture generating unit to an eye-box such that a virtual image of the picture is visible therefrom. As described herein, the eye-box comprises an area, optionally a volume, from which the virtual image can be fully perceived by a viewer. As the skilled person will appreciate, the virtual image becomes increasingly less completely visible from viewing positions further away from the eye-box.

Ray tracing techniques may be used to measure parameters, such as distortion and horizontal/vertical disparity, in order to objectively identify viewing positions where the virtual image is clear. Based on such measurements, the inventors have recognised that the optical relay system may be configured in order to define the eye-box area to satisfy design requirements, such as packing requirements.

Rotationally-Misaligned Holographic Reconstruction

A holographic projection system or holographic projector is described with reference to FIG. 4. A monochromatic light source is arranged to output light 401 having a first wavelength. The light 401 in this embodiment is a beam of collimated light from a laser light source. The light 401 is incident upon a spatial light modulator (or SLM) 403, which is arranged to receive the laser light 401 from the laser light source. SLM 403 is arranged to display a diffractive pattern. Light 401 that is received by the spatial light modulator 403 (and so illuminates the SLM) is spatially modulated in accordance with the diffractive pattern displayed on SLM 403 to form a holographic reconstruction/replay field 409. The diffractive pattern comprises a hologram of a picture. The holographic reconstruction is a holographic reconstruction of the picture.

The replay field 409 is a region of space into which light can be projected. The replay field 409 is coplanar with/defines a replay plane. The holographic reconstruction/replay field 409 comprises a picture area 411 (or image region) in which information for a user to view can be projected. For example, when the projection system is deployed in an automobile, information for display to a driver (such as the speedometer) can be provided in the picture area 411. The area outside of the picture area 411 may be referred to generally as the non-picture area 413. As will be described in more detail below, light of the non-picture area 413 can be blocked by a physical mask. Thus, only the picture area 411 may be visible to a user during normal use of the system. The picture area 411 and non-picture area 413 are separated by boundary 412. The boundary 412 defines the shape of the picture area 411. The picture area 411 is substantially rectangular such that the boundary comprises first and second horizontal edges and first and second vertical edges. The bottommost (first) horizontal edge 422 will be referred to throughout this disclosure.

In this embodiment, the non-picture area 413 comprises a noise area 415 and an optional a control area 417. The noise area 415 comprises noise. As above, the diffractive pattern comprises a hologram of a picture. In this embodiment, the hologram is a computer-generated hologram (such as one that has been calculated in accordance with the one of methods described above). As described above, a computer-generated hologram typically comprises the use of one or more algorithms to converge on a hologram (e.g. a phase-only hologram) of an image. Generally, it is much less computationally expensive to converge on a hologram of a picture that comprises noise when it is reconstructed. However, the hologram can be calculated in a way such that the noise is conveniently located or "dumped" in the noise area 415 which is outside (e.g. bordering) a picture area 413. As the noise area 415 (as part of the non-picture area 413) is usually not visible during normal use of the system, the noise that is "dumped" in the noise area 415 is not visible to a user of the system. Thus, a more computationally inexpensive hologram (in which some noise is formed in the holographic reconstruction) can be calculated. The control area 417 can be used in a control process of the system. In this example, the control area 417 is a relatively small patch of light (e.g. a relatively small number of image pixels). The system comprises a detector (not shown in the Figures) arranged to detect a property of the control area 417. In this embodiment, the detected property of the control area 417 is brightness. The system may be arranged to alter the hologram calculation/self-calibrate based on the detected property, for example to maintain a consistent brightness of the hologram. FIG. 4 shows a single control area 417. It should be clear that the holographic reconstruction 409 may comprise any number of further control areas. Furthermore, it should be clear that the (one or more) control areas may be used for a variety of different control processes. Other examples of control processes may include measuring the wavelength of the light 401 or maintaining an acceptable/good colour balance.

The position of the holographic reconstruction/replay field 409 on the replay plane depends on the diffractive pattern displayed on the SLM 403. The diffractive pattern can be arranged to translate and/or rotate the holographic reconstruction. However, misalignments of individual components or parts of the system can result in the holographic reconstruction/replay field 409 deviating from its intended position. As will be explained herein, these deviations from the intended position of the holographic position can have serious adverse effects. This disclosure provides a method of calibrating a holographic projector to compensate for rotational misalignments within the holographic projector (which cause rotational misalignment of the holographic reconstruction with respect to the intended position of the holographic reconstruction in the case that the holographic projector is perfectly aligned).

Figure 4:
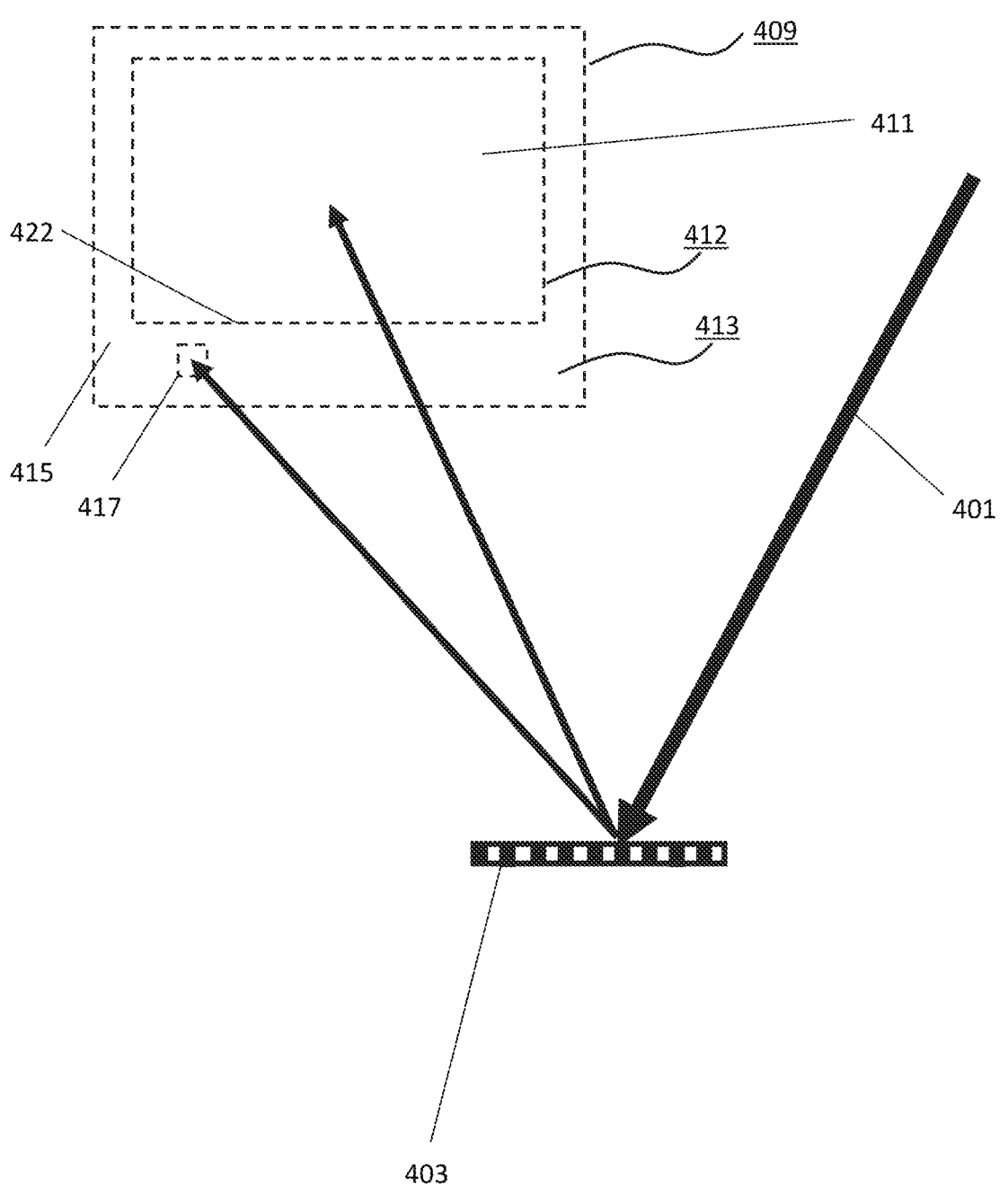
FIG. 4 is a schematic of feature of a holographic projection system used to form a holographic reconstruction on a replay plane, the holographic reconstruction comprising a picture area and a non-picture area.
Figure 5:
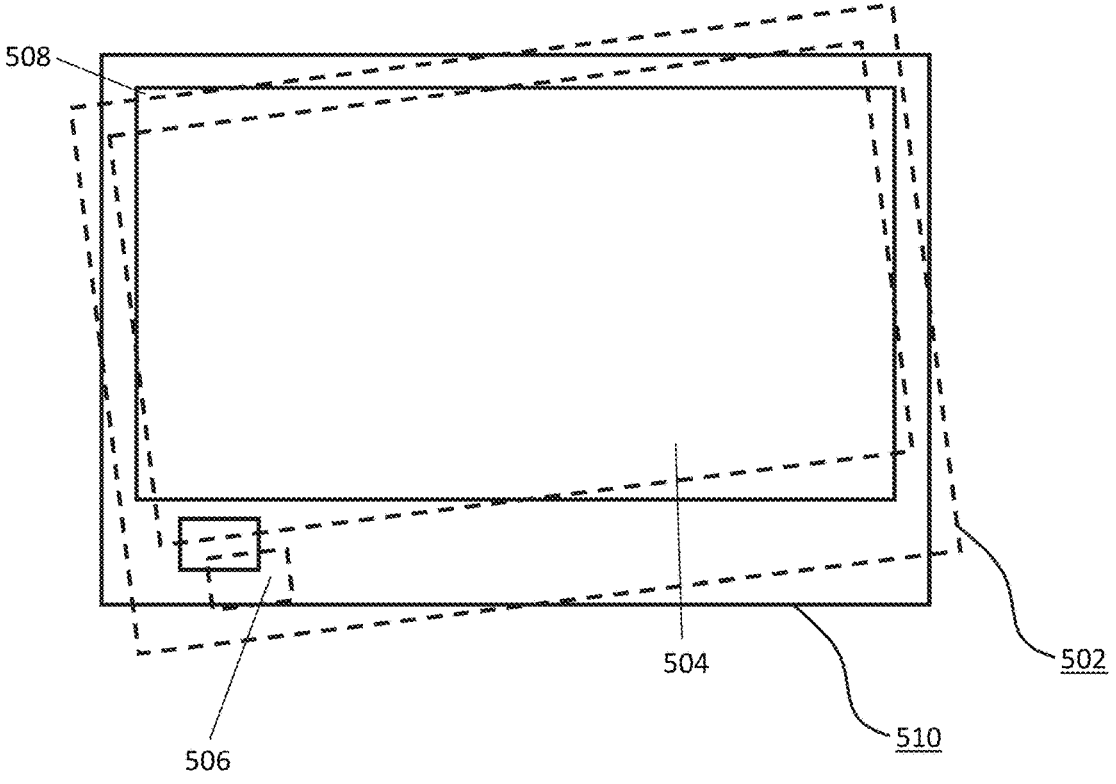
FIG. 5 is a schematic view of a first and second representation of a holographic reconstruction, the first representation of the holographic reconstruction is rotationally misaligned and the second representation of the holographic reconstruction is correctly aligned, the first and second representations are superimposed on one another.

FIG. 5 shows a schematic view of a holographic reconstruction (corresponding to the holographic reconstruction 409 shown in FIG. 4). FIG. 5 shows two representations of the holographic reconstruction. A first representation 502 of the holographic reconstruction is representative of a holographic reconstruction when the holographic projector used to form the holographic reconstruction is rotationally misaligned. The first representation 502 of the holographic reconstruction is represented by broken (dashed) lines, and comprises a picture area 504 and a non-picture area 506. For example, one or more of the light source and SLM and other optical components (such as lenses) of the holographic projector may be misaligned causing a rotational misalignment of the holographic reconstruction that is formed. A second representation 510 of the holographic reconstruction is representative of a holographic reconstruction when the holographic projector used to form the holographic reconstruction is correctly/perfectly aligned. The second representation 510 of the holographic reconstruction is represented by unbroken lines. In the first representation 502, lower and upper edges of the boundary defining a rectangular picture area 508 are not aligned with true horizontal and left and right edges of the boundary are not aligned with true vertical. In the second representation 510, lower and upper edges of the boundary defining a rectangular picture area 508 are aligned with true horizontal and left and right edges of the boundary are aligned with true vertical. FIG. 5 shows an example of how the holographic reconstruction may deviate from its intended position as a result of rotational misalignment. In particular, the entire holographic reconstruction/replay field has been rotated. This has resulted in both the picture area and the non-picture area of the first representation 502 being rotated with respect to the picture area and the non-picture area of the second representation 510.

The rotational misalignment of the holographic reconstruction (as per the first representation 502) can cause significant problems. One self-evident problem is that the content of the picture area (as viewed by a user of the system) will appear rotated with respect to the intended position of the content. This is undesirable. Another problem is that the control area may become misaligned with a detector arranged to detect the control area. FIG. 5 shows how the control area in the first representation 502 is shifted relative to the control area in the second representation 510. If the control area is substantially aligned with a detector in the second representation 510, then it should be clear that it will not be substantially aligned with the detector in the first representation 502. This misalignment of the detector and control area could result in inaccuracies in control processes run by the holographic projector.

To be clear, FIG. 5 is schematic and not drawn to scale. The rotational misalignment of the first representation 502 in FIG. 5 relative to the second representation 510 is exaggerated relative to the typical sort of rotational misalignments that may arise due to manufacturing tolerances in the assembly of the holographic projector. Typical rotational misalignments of the first representation 502 relative to the second representation 510 may of the order of no more than one or two degrees, often a fraction of a degree. Furthermore, it should be clear that the ideal/perfectly aligned holographic projector is not required to form a holographic reconstruction in which the boundary is parallel to truly horizontal. This is exemplary.

The holographic projector has thus far been described as a monochromatic system. However, the problems of rotational misalignments may be even greater in colour holographic projectors, as is described herein.

Colour Holographic Projector

Some holographic projectors comprise a plurality of single colour channels. Each single colour channel comprises a single colour holographic projector forming a single colour holographic reconstruction (i.e. image or picture). A plurality of single colour holographic reconstructions are formed on a common replay plane. A full colour holographic reconstruction may be formed using coincident red, green and blue pictures. In some embodiments, the hologram is a Fourier hologram. In other embodiments, the hologram is a Fresnel hologram.

Figure 6:
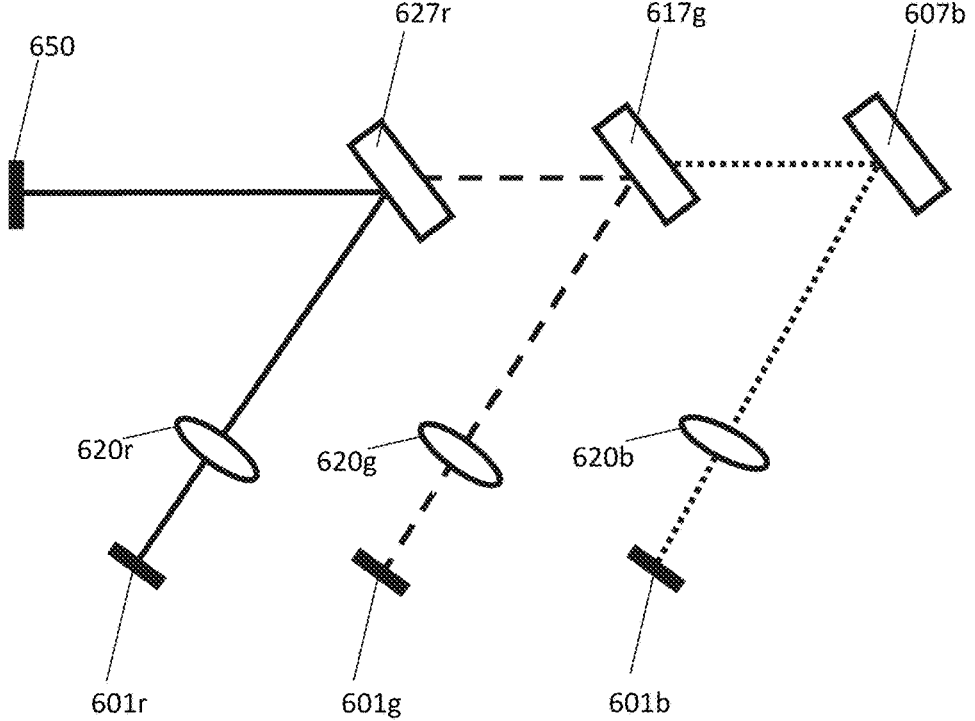
FIG. 6 is a schematic view of a plurality of independent single colour holographic channels.

FIG. 6 shows red, green and blue colour channels. The red channel comprises a first spatial light modulator 601*r*, a first lens 620*r* and a first mirror 627*r*. The green channel comprises a second spatial light modulator 601*g*, a second lens 620*g* and a second mirror 617*g*. The blue channel comprises a third spatial light modulator 601*b*, a third lens 620*b* and a third mirror 607*b*. Each single colour channel forms a single colour holographic reconstruction (or picture) on replay plane 650. The first lens 620*r*, second lens 620*g* and third lens 620*b* are optional. If each displayed hologram is a Fourier hologram, the first lens 620*r*, second lens 620*g* and third lens 620*b* may contribute to the Fourier transform of each respective hologram.

The first spatial light modulator 601*r* displays a hologram corresponding to a red picture. The first spatial light modulator 601*r* is illuminated with red light. The first lens 620*r* receive spatially modulated light from the first spatial light modulator 601*r* and forms a red holographic reconstruction on the replay plane 650. The first mirror 627*r* is disposed between the first lens 620*r* and replay plane 650.

The second spatial light modulator 601*g* displays a hologram corresponding to a green picture. The second spatial light modulator 601*g* is illuminated with green light. The second lens 620*g* receive spatially modulated light from the second spatial light modulator 601*g* and forms a green holographic reconstruction on the replay plane 650. The second mirror 617*g* is disposed between the second lens 620*g* and replay plane 650.

The third spatial light modulator 601*b* displays a hologram corresponding to a blue picture. The third spatial light modulator 601*b* is illuminated with blue light. The third lens 620*b* receive spatially modulated light from the third spatial light modulator 601*b* and forms a blue holographic reconstruction on the replay plane 650. The third mirror 607*b* is disposed between the third lens 620*b* and replay plane 650.

The first mirror 627*r* is a first dichroic mirror arranged to reflect red light and transmit green and blue light. The second mirror 617*g* is a second dichroic mirror arranged to reflect green light and transmit blue light. The third mirror 607*b* is reflective to blue light.

Each single colour light path comprises a first part from spatial light modulator to mirror and second part from mirror to replay plane. In embodiments, the first parts of the single channels are spatially-offset but substantially parallel. In embodiments, the second parts of the single channels are substantially colinear.

The red light path from the first spatial light modulator 601*r* to replay plane 650 comprises a reflection off the first mirror 627*r*. The green light path from second spatial light modulator 601*g* to replay plane 650 comprises a reflection off second mirror 617*g* followed by a transmission through the first mirror 627*r*. The blue light path from third spatial light modulator 601*b* to replay plane comprises a refection off third mirror 607*b* followed by a transmission through the second mirror 617*g* and then a transmission through the first mirror 627*r*. The replay plane 650, first mirror 627*r*, second mirror 617*g* and third mirror 607*b* are substantially colinear. The blue path length is greater than the green path length which is greater than the red path length. Specifically, in embodiments, the second part of the blue light path is longer than that of the green light path which is, in turn, longer than that of the red light path. In these embodiments, the first parts may be substantially equal in length.

Each single colour channel may be used to form a holographic reconstruction within a replay field area. The red replay field may contain the red picture content of the picture. The green replay field may contain the green picture content of the picture. The blue replay field may contain the blue picture content of the image. The person skilled in the art will be familiar with the idea of forming a picture by superimposing red, green and blue picture content using red, green and blue colour channels. The alignment of the red, green and blue replay fields is crucial to image quality. Each single colour picture may comprise image pixels. In the case of holographic projection, the image pixels may be referred to as light spots.

In some embodiments, a magnified image of the colour picture is formed. In some embodiments, the image formed is a virtual image. In some embodiments, the colour picture is the picture of a picture generating unit of a head-up display in a vehicle. A virtual image of the colour picture may be formed by magnifying optics (e.g. a mirror) of the head-up display and an optical combiner such as the windscreen of the vehicle.

Figure 7C:
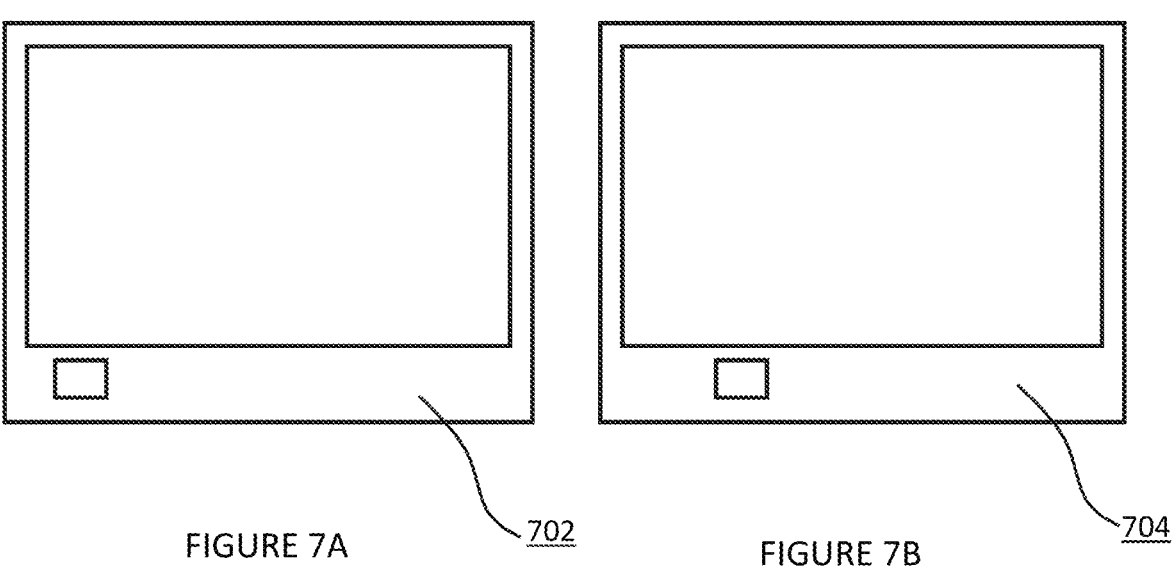
FIG. 7C is a schematic view of the first holographic reconstruction of FIG. 7A superimposed on the second holographic reconstruction of FIG. 7B when the first and second holographic reconstructions are correctly aligned.

FIG. 7A shows schematic representations of a red holographic reconstruction 702 formed by the red channel of FIG. 6. FIG. 7B shows a schematic representation of a green holographic reconstruction 704 formed by the green channel of FIG. 6. FIG. 7C shows a schematic representation of the red holographic reconstruction 702 superimposed on to the green holographic reconstruction 704. FIG. 7C shows the idealised situation in which the holographic projector is correctly aligned.

Each of the red and green holographic reconstructions 702,704 have a similar form to the monochromatic holographic reconstruction of FIG. 5. In particular, each of the red and green holographic reconstructions 702,704 comprise a picture area and a non-picture area comprising a control area. The picture areas of the red and green holographic reconstructions 702,704 are intended to completely overlap with one another when the red and green holographic reconstruction are superimposed (as in FIG. 7C). The red and green holographic reconstructions 702,704 are both pixelated. When the red and green holographic reconstructions 702,704 are superimposed with one another, the pixels (at least in the picture area) are in complete alignment with one another (in order to achieve a good quality colour image). The control areas are intended to be spatially separated with one another when the red and green holographic reconstructions are superimposed (as in FIG. 7C). In this way, a first control area 706 of the red holographic reconstruction 702 can be detected separately to a second control area 708 of the green holographic reconstruction 704. This is why the first and second control areas 706,708 appear adjacent one another in the superposition of FIG. 7C.

Figure 8A:
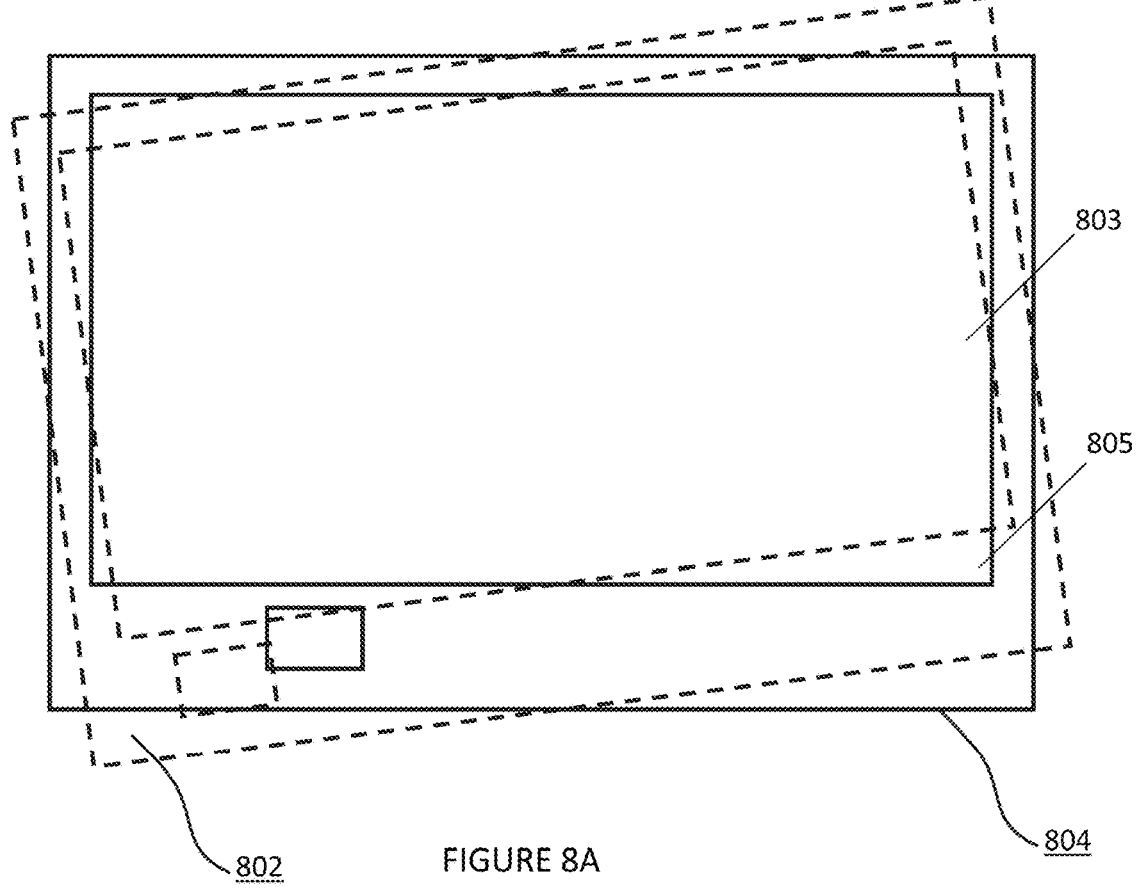
FIG. 8A is a schematic view of the first holographic reconstruction of FIG. 7A superimposed on the second holographic reconstruction of FIG. 7B when the first holographic reconstruction is rotationally misaligned.
Figure 8B:
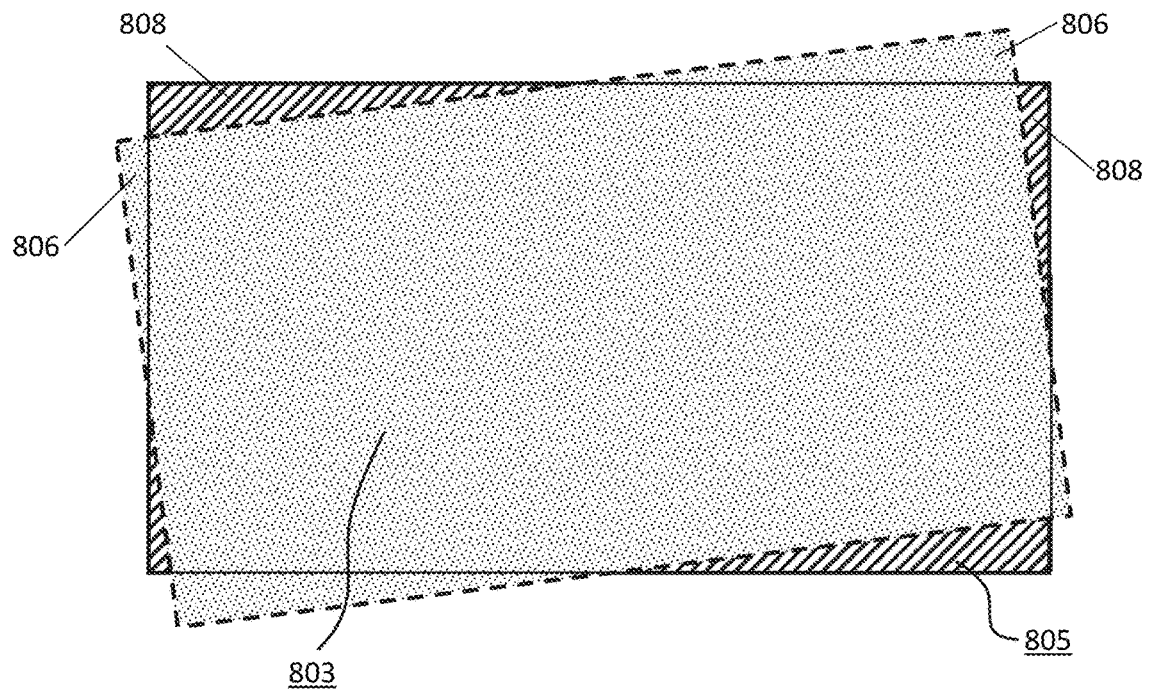
FIG. 8B is a schematic view of the picture areas of the first and second (superimposed) holographic reconstructions of FIG. 8A.

FIG. 7C shows the ideal case, without rotational misalignments in the holographic projector. However, this ideal case is generally not possible without calibration, at least due to manufacturing tolerances in the holographic projector. This can result in the red holographic reconstruction being rotationally misaligned with the green holographic reconstruction. This is shown in FIG. 8A. FIG. 8A shows a red holographic reconstruction 802 (corresponding to FIG. 7A) superimposed on the green holographic reconstruction 804 (corresponding to FIG. 7B) but with the presence of misalignments within the holographic projector. FIG. 8B shows the superposition of the picture areas of the red and green holographic reconstructions only. A first picture area 803 corresponds to the picture area of the red holographic reconstruction 702 and a second picture area 805 corresponds to the picture area of the green holographic reconstruction 804. Because the first picture area 803 is rotated relative to the second picture area 805, portions of the picture areas do not overlap. (First) portions 806 of the first picture area 803 that do not overlap with the second picture area 805 appear red. (Second) portions 808 of the second picture area 805 that do not overlap with the first picture area 803 appear green. Thus, the rotational misalignment causes discolouration of the superimposed picture areas.

Figure 9:
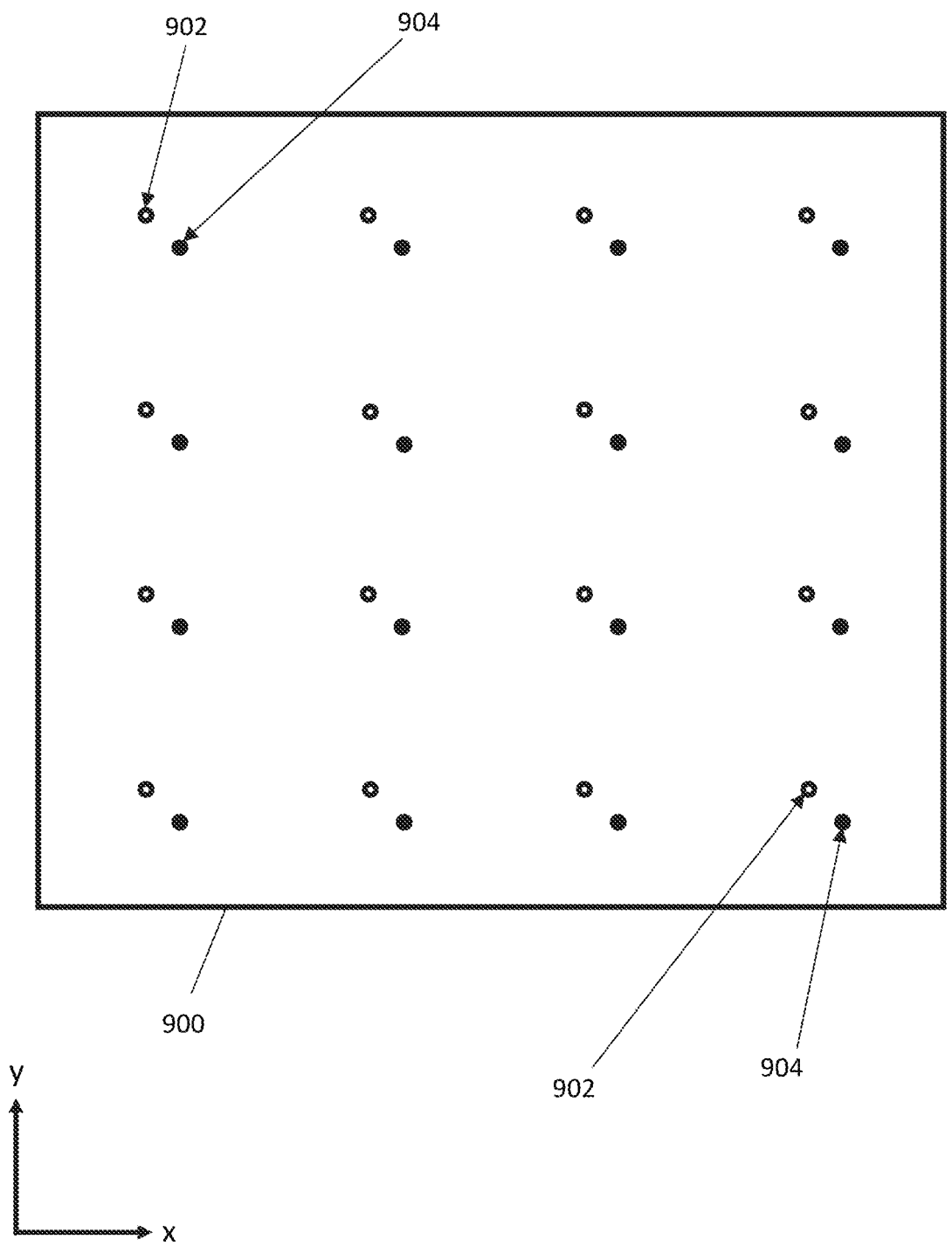
FIG. 9 is a magnified portion of the overlapping picture areas of the first and second holographic reconstructions.

More generally, the rotational misalignment between the picture areas results in poor image quality because the individual pixels of the first and second picture areas 803, 805 are misaligned. This is shown in FIG. 9 which shows a magnified portion 900 of FIG. 8C (a portion where the first and second picture areas 803,805 do overlap). In particular, first pixels 902 of the first picture area 803 are misaligned with respect to second pixels 904 of the second picture area 805.

Figure 7C:
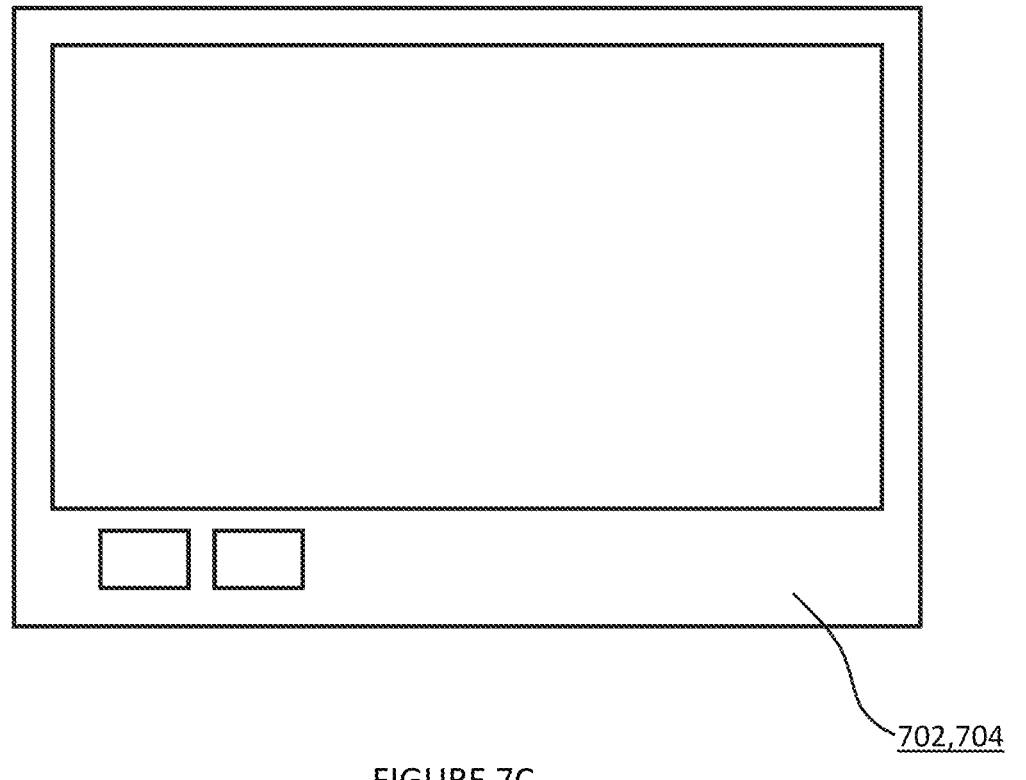

The holographic projection system described in relation to FIGS. 7 to 9 comprises two channels/two light sources/two holographic reconstructions (red and green). This is exemplary only. The holographic projection system may comprise any number of hologram channels and holographic reconstructions. Typically, the holographic projection system may comprise three channels and so three holographic reconstructions (that are superimposed). In some examples, these three holographic reconstructions may consist of a red holographic reconstruction, a green holographic reconstruction and a blue holographic reconstruction. The or each of the holographic reconstructions may be rotationally misaligned from the ideal case (in which the boundary is horizontal/vertical) as described above.

Mask

In addition to what has been disclosed above, the holographic projector further comprises a physical mask. The mask is arranged at or immediately downstream of the plane on which the holographic reconstructions are formed. When the holographic projector is operating normally, the mask is arranged to block light of the non-picture areas and allow the propagation/transmission of light of the picture areas.

Figure 10:
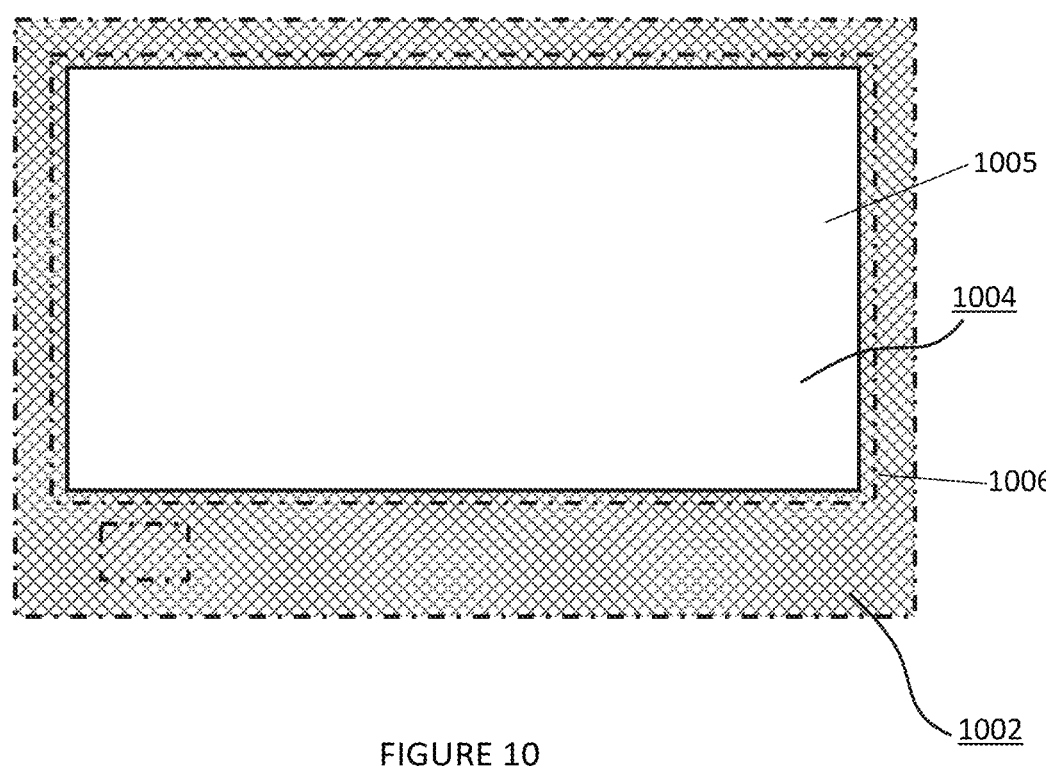
FIG. 10 is a schematic view of a mask applied over as holographic reconstruction.

Such a mask 1002 is shown schematically in FIG. 10. In FIG. 10, the mask 1002 is overlaid on a properly aligned holographic reconstruction. The positions of the features of the holographic reconstruction (such as the control area) are represented by broken (dashed and dotted) lines. The mask 1002 comprises an opening or aperture 1004. The aperture 1004 is aligned with the picture area 1005 of the or each holographic reconstruction and so light of the picture area 1005 is visible beyond the mask 1002. The aperture 1004 is slightly smaller than the picture area 1005. As such, the boundary 1006 between the picture area 1005 and the non-picture area is not visible beyond the mask. The result is that a portion of the picture area 1005 around its perimeter is not visible beyond the mask. Nor is the non-picture area.

Method of Calibrating for Rotational Misalignments

This disclosure proposes a method of calibrating the holographic projector to compensate for the rotational misalignment of one or more of the holographic reconstructions. Generally, the method comprises determining a calibration feature in the holographic reconstruction and using that calibration feature to quantify any rotational misalignment of the holographic reconstruction. In particular, the method comprises comparing the determined calibration feature to a target (for example, measuring the angle between the determined calibration feature and the target) and recalculating the hologram of the picture in response such that rotational misalignments in the holographic reconstruction of the recalculated hologram are reduced.

Figure 11:
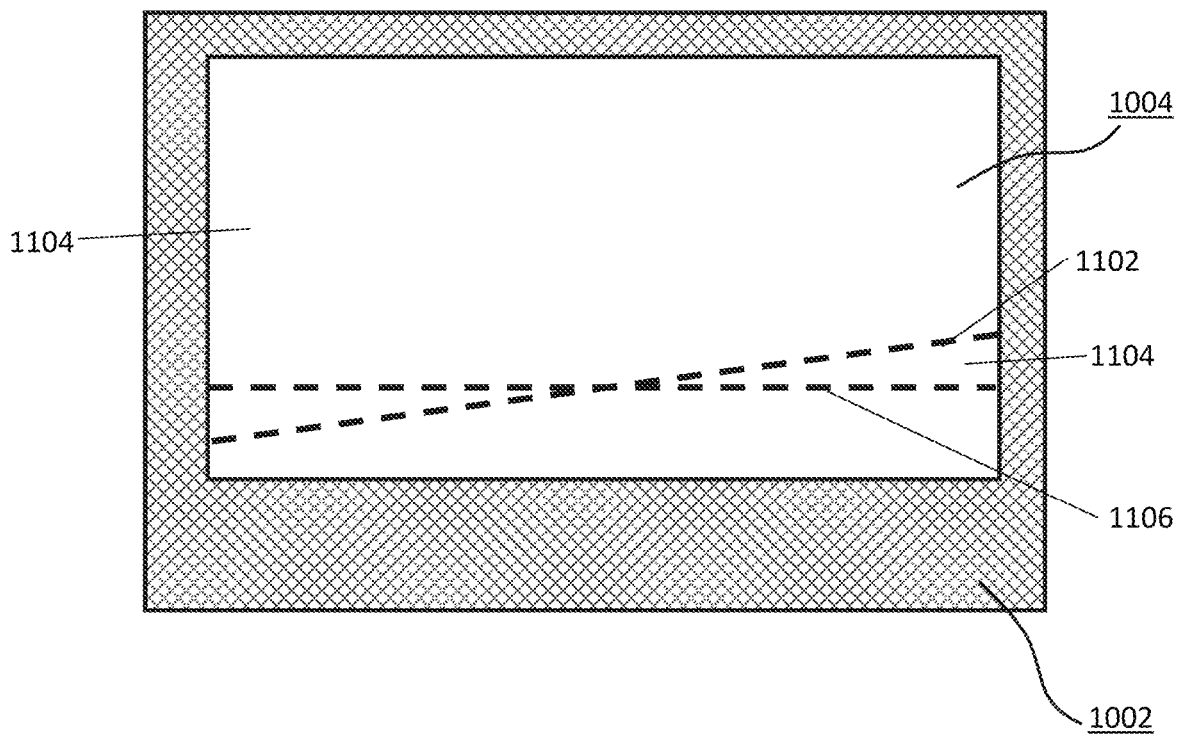
FIG. 11 is a schematic view of the mask of FIG. 10 when a phase-ramp function has been applied to the first and second holographic reconstructions of FIG. 8A, in accordance with the present disclosure.
Figure 12:
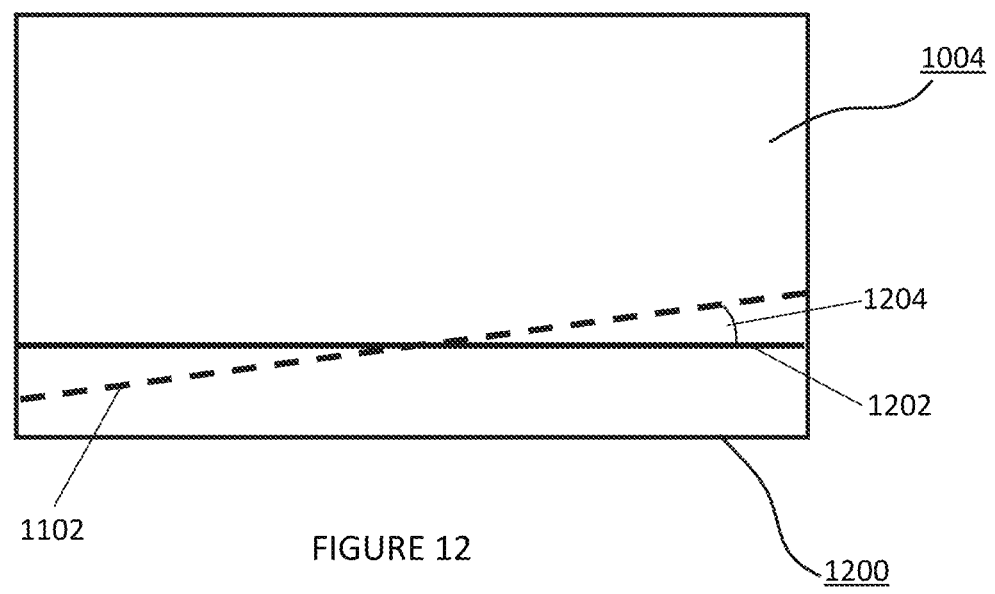
FIG. 12 is a schematic view of an image captured within an aperture of the mask, showing the boundaries of the first and second holographic reconstructions, a predetermined target superimposed on the image and a measured angle.
Figure 13:
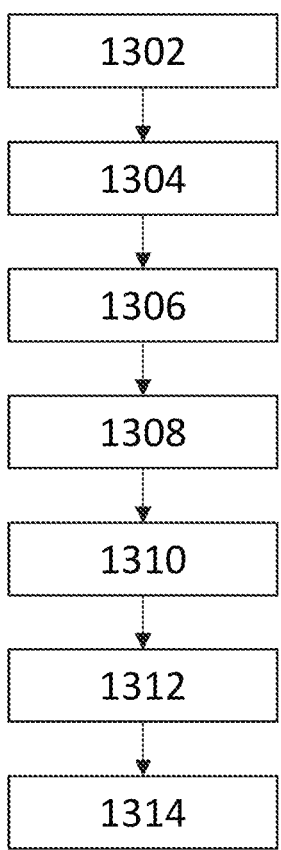
FIG. 13 is a flow diagram of a method in accordance with the present disclosure.

One particular example of a method of calibrating a holographic projector is described in relation to FIGS. 11 to 13. This example utilises a phase-ramp function (or grating function) to linearly translate the holographic reconstruction from a first position to a second position. In particular, the diffractive pattern displayed on the SLM comprises a hologram of a target image and the phase-ramp function. The first position is a position of the holographic reconstruction during normal use of the holographic projector. The first position of the holographic reconstruction with respect to the mask 1002 substantially corresponds to the position shown in FIG. 10. The inclusion of the phase-ramp function in the diffractive pattern translates or shifts the holographic reconstruction to bring the boundary between the picture area and non-picture area of the holographic reconstruction (which is not usually in visible beyond the mask 1002) into view. In this example, the translation of the holographic reconstruction by the phase ramp function is upwards. This is shown in FIG. 11.

FIG. 11 is a schematic view showing the mask 1002; a first boundary 1102 between a first picture area 1104 and a non-picture area of a first holographic reconstruction; and a second boundary 1106 between a second picture area 1108 and a second non-picture area of a second holographic reconstruction. FIG. 11 shows the case when the diffractive pattern displayed on the SLM associated with both the first and second holographic reconstructions comprises a phase-ramp function arranged to translate the first and second holographic reconstructions upwards, thus bringing the boundaries 1106,1108 (which are not visible during normal use of the holographic projector) into the region of the aperture of the mask 1102 such that the boundaries 1106, 1108 are visible.

In some examples, the method of calibrating the holographic projector further comprises capturing (using a camera) an image of the holographic reconstruction; identifying the or each boundary visible in the image; superimposing a target that is known to be correctly aligned on to the image and measuring an angle between the identified boundary and the superimposed target. FIG. 12 shows an example of such a captured image 1200 of the superposition of the first and second holographic reconstructions shown in FIG. 11.

The image 1200 of FIG. 12 is captured beyond the mask 1002 such that the only the light that has passed through the aperture of the mask is visible in the image. A horizontal target line 1202 has been superimposed on to the image 1200. In this example, the first holographic reconstruction is rotationally misaligned and so the boundary 1102 of the first holographic reconstruction is angled with respect to the horizontal target line 1202. The angle 1204 between boundary 1102 and the horizontal target line 1202 is measured. In this example, the second holographic reconstruction is already correctly aligned (and so is substantially horizontal). Thus, there is no angle between the boundary 1108 and the horizontal target line 1202.

In response to the measured angle 1204 of misalignment of the first holographic reconstruction, the hologram associated with the first holographic reconstruction is recalculated/modified to compensate for/reduce the misalignment. This brings the first holographic reconstruction into alignment with the second hologram reconstruction. Thus, the superimposed first and second hologram reconstructions have the appearance of that shown in FIG. 7C. The phase-ramp functions can then be removed from the respective SLMs such that the holographic reconstructions are formed in the first position (such that the respective picture areas of the holographic reconstructions is substantially aligned with the aperture of the mask 1002.

The above calibration has been described in relation to determining that one of the holographic reconstructions is rotationally misaligned. However, it should be clear that both of the first and second holographic reconstruction may be rotationally misaligned and that an angle with respect to the horizontal target line 1202 may be determined for each holographic reconstruction. It should also be clear that the above calibration process could be applied to any number of holographic reconstructions (e.g. three holographic reconstructions).

The example method of calibrating a holographic projector will now be described in relation to the flow chart shown in FIG. 13.

Step 1302 of the method comprises displaying a primary diffractive pattern on a first SLM and a secondary diffractive pattern on a second SLM. The primary diffractive pattern comprises a first hologram of a first target image and a phase-ramp function. The secondary diffractive pattern comprises a second hologram of a second target image and a phase-ramp function. The phase-ramp function of the first and second diffractive pattern is the same.

Step 1304 of the method comprises illuminating the primary diffractive pattern with light of a first wavelength (in this example, red light) and illuminating the second diffractive pattern with light of a second wavelength (in this example, green light). This causes a first holographic reconstruction of the first target image to be formed on a replay plane and a second holographic reconstruction of the second target image to be formed on the replay plane. The phase-ramp function (of the first and second diffractive pattern) is arranged to translate the first and second holographic reconstructions from a first position to a second position. This is what is shown in FIG. 11 and described in more detail previously.

Step 1306 comprises blocking at least a portion of the holographic reconstruction using the mask 1002 positioned substantially at the replay plane. The mask is arranged such that, when the phase-ramp functions are not displayed on SLMs (and the first and second holographic reconstructions are in the first position), the aperture of the mask is substantially aligned with the first picture area of the first and second holographic reconstruction. More generally, the mask is arranged to block the non-picture area of the first and second holographic reconstructions (to prevent, for example, any noise areas and control areas from being visible to a user during normal use of the holographic projector). This is similar to what is shown in FIG. 10. However, during step 1306, the phase-ramp functions are displayed on the first and second SLMs and the holographic reconstructions are in their respective second positions (as shown in FIG. 11). Thus, the boundary between picture area and the non-picture area of each of the holographic reconstructions is visible beyond the mask.

Step 1308 of the method comprises capturing an image of the first and second holographic reconstructions through the aperture of the mask 1002.

Step 1310 of the method comprises measuring a property of the straight-line boundary between the picture area and the non-picture area, which (as above) is visible beyond the mask owing to the phase-ramp function.

Step 1312 of the method comprises determining a rotational misalignment of the holographic reconstruction of the target image by measuring the angle between a target and the straight-line boundary between the picture area and the non-picture area.

Step 1314 of the method comprises calculating a modified first hologram such that light that is spatially modulated in accordance with the modified first hologram forms a first modified holographic reconstruction on the replay plane. In embodiments, at least a portion of the first modified holographic reconstruction is rotated relative to the unmodified first holographic reconstruction. This is such that a rotational misalignment of the modified first display area is reduced relative to the unmodified holographic reconstruction. Step 1314 of the method optionally further comprises calculating a modified second hologram such that light that is spatially modulated in accordance with the modified second hologram forms a second modified holographic reconstruction on the replay plane. In embodiments, at least a portion of the second modified holographic reconstruction of the second modified hologram is rotated relative to the unmodified second holographic reconstruction.

In this embodiment, the first (and second) modified holograms have been modified such that the entire holographic reconstruction is rotated on the replay plane, for example using a rotation matrix operation. This results in the picture area and any control areas being rotated simultaneously, in one operation.

In other embodiments (not illustrated), the picture area and the control areas are rotated in separate operations. As described above, there is a boundary 1102 between a picture area and a non-picture area in the holographic reconstruction. This boundary may be defined in the hologram calculation. It should be clear to the skilled reader that the location of this boundary can be adjusted in the hologram calculation. This has the effect of moving the picture area within the non-picture area on the replay plane. For example, the picture area could be moved closer to an edge of the replay plane without moving the non-picture area. In other words, the layout of the replay plane or the layout of the picture area with respect to the replay plane may be defined within the hologram calculation/within software. The layout definition/ constraint may be referred to as the layout mask which defines where in the replay plane picture content is displayed. As above, the hologram calculation may be arranged to push any noise in the hologram outside of the area defined as the picture area by the layout mask. The layout mask is effectively a software mask.

In some examples, the layout mask is rotated in order to rotate to the picture area to reduce a rotational misalignment (as measured based on the boundary 1102). The first (and, optionally, second) holograms may be recalculated based on the new position of the layout mask. Thus, in the first (and, optionally, second) holographic reconstructions a rotational misalignment of the picture area (with respect to the physical mask) will be corrected.

However, this adjustment of the layout mask has not adjusted for the rotational misalignment of the control areas. Thus, when recalculating the hologram, in such examples, it may be necessary to apply a rotation misalignment correction to each of the control spots that is separate to the rotation of the layout mask. In examples, that repositioning is just rotating the position of the control areas around the center of the replay field by the same angle the layout mask was rotated. The control spot position adjustment is taken into account when the first (and, optionally, second) holograms are recalculated.

The inventors have recognised that the method of calibrating a holographic projector described above is particular advantageous because the boundaries of the picture areas of the holographic reconstructions provide features that can be conveniently and reliably be measured. Thus, although it is normally undesirable for the boundary of the picture area to be visible beyond the mask, the inventors have recognised that, in this specific calibration method, it can be advantageous to temporally shift the boundary into view using the phase-ramp functions.

However, there are many other advantages of the specific method of calibrating a holographic projector described above which extend to other example methods too. These advantages include that the calibration method can be performed entirely in software. There is no need for slow and complex manual adjustments of components of the holographic projector in order to correct misalignments. This also means that the method may be performed away from the manufacturing line, for example in situ. These advantages could be achieved in methods of calibration using features in the holographic reconstruction other than the boundary between the picture area and the non-picture area. For example, some other convenient feature of the holographic reconstruction could be selected. In particular, the diffractive pattern displayed on the SLM could be arranged such that picture area of the holographic reconstruction displays a convenient feature for measuring such as a straight line (in particular, a horizontal or vertical line) which is visible without the application of a phase-ramp function. The feature may correspond to a target which is superimposed on the image of reconstruction which is captured as part of the calibration method. Any angle between the target and the feature may be measured and the hologram modified/recalculated accordingly.

Additional Features

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some arrangements describe 2D holographic reconstructions by way of example only. In other arrangements, the holographic reconstruction is a 3D holographic reconstruction. That is, in some arrangements, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A method of calibrating a holographic projector comprising:

displaying a primary diffractive pattern on a display device, wherein the primary diffractive pattern comprises a first hologram of a first target image and a phase-ramp function;

illuminating the primary diffractive pattern to form a first holographic reconstruction of the first target image on a replay plane, wherein the first target image comprises a picture area and a non-picture area, and wherein the phase-ramp function is arranged to translate the first holographic reconstruction;

blocking at least a portion of the first holographic reconstruction using a mask, wherein the mask is arranged to block the non-picture area in an absence of the phase-ramp function; and measuring a property of a boundary between the picture area and the non-picture area.

2. The method of claim 1, wherein measuring the property of the boundary comprises measuring a straight edge of the boundary.

3. The method of claim 1, further comprising determining a rotational misalignment of the first holographic reconstruction of the first target image based on the measured property of the boundary.

4. The method of claim 3, wherein determining a rotational misalignment of the first holographic reconstruction of the first target image comprises capturing an image of the first holographic reconstruction and identifying at least a portion of the boundary between the picture area and the non-picture area in the captured image.

5. The method of claim 4, wherein determining a rotational misalignment of the first holographic reconstruction further comprises adding an image element on to the captured image and then measuring an angle between the image element and the identified boundary.

6. The method of claim 5, wherein the image element comprises a straight line such as a vertical or horizontal line.

7. The method of claim 1, further comprising calculating a modified first hologram, the modified first hologram being calculated such that light that is spatially modulated in accordance with the modified first hologram forms a modified first holographic reconstruction on the replay plane, at least a portion of the modified first holographic reconstruction being rotated relative to the first holographic reconstruction.

8. The method of claim 7, wherein the modified first hologram is calculated such that a rotational misalignment of the at least a portion of the modified first holographic reconstruction is reduced relative to the first holographic reconstruction.

9. The method of claim 7, wherein the method further comprises:

displaying a second primary diffractive pattern on the display device, the second primary diffractive pattern comprising the modified first hologram; and illuminating the second primary diffractive pattern to form a modified first holographic reconstruction of the first target image on the replay plane.

10. The method of claim 1, wherein the mask comprises an aperture, and wherein the aperture is arranged such that the picture area is substantially visible downstream of the mask in the absence of the phase-ramp function.

11. The method of claim 1, wherein the phase-ramp function is arranged to translate the first holographic reconstruction from a first position to a second position along a linear axis, wherein illuminating the primary diffractive pattern, blocking at least a portion of the first holographic reconstruction, and measuring a property of the boundary are performed while the first holographic reconstruction is in the second position.

12. The method of claim 1, wherein the first holographic reconstruction is spatially separated from the display device.

13. The method of claim 1, further comprising displaying a diffractive pattern comprising the first hologram in the absence of the phase-ramp function before displaying the primary diffractive pattern.

14. The method of claim 1, wherein illuminating the primary diffractive pattern comprises illuminating the primary diffractive pattern with monochromatic light of a first wavelength, such as red light.

15. The method of claim 1, further comprising:

displaying a secondary diffractive pattern on a display device, wherein the secondary diffractive pattern comprises a second hologram of a second target image and a phase-ramp function;

illuminating the secondary diffractive pattern to form a second holographic reconstruction of the second target image on a replay plane, wherein the second target image comprises a picture area and a non-picture area;

blocking at least a portion of the second holographic reconstruction using the mask, wherein the mask is arranged to block the non-picture area in the absence of the phase-ramp function; and measuring a property of a boundary between the picture area and the non-picture area of the second holographic reconstruction.

16. The method of claim 15, wherein illuminating the secondary diffractive pattern comprises illuminating the secondary diffractive pattern with monochromatic light of a second wavelength, such as green light.

17. A system comprising a holographic projection system, the holographic projection system comprising:

a light source arranged to output light;

a display device arranged to display a diffractive pattern comprising a hologram of a target image and to receive light from the light source and output spatially modulated light in accordance with the diffractive pattern to form a holographic reconstruction of the target image at a replay plane;

a mask arranged to block at least a portion of the holographic reconstruction;

a camera arranged to capture an image of a portion of the holographic reconstruction that is visible downstream of the mask; and a processor arranged to:

display a primary diffractive pattern on the display device;

the primary diffractive pattern comprising a first hologram of a first target image comprising a picture area and a non-picture area and a phase-ramp function arranged to translate the holographic reconstruction; and capture an image of the holographic reconstruction to measure a property of a boundary between the picture area and the non-picture area;

wherein the mask is arranged to block the non-picture area in an absence of the phase-ramp function.

18. The system of claim 17, further comprising a picture generating unit, wherein the picture generating unit comprises the holographic projection system.

19. The system of claim 18, further comprising a head-up display, wherein the head-up display comprises the picture generating unit.

20. Tangible, non-transitory computer-readable media comprising program instructions therein, wherein the program instructions, when executed by one or more processors, cause a system to perform a method of calibrating a holographic projector comprising:

displaying a primary diffractive pattern on a display device, wherein the primary diffractive pattern comprises a first hologram of a first target image and a phase-ramp function;

illuminating the primary diffractive pattern to form a first holographic reconstruction of the first target image on a replay plane, wherein the first target image comprises a picture area and a non-picture area, and wherein the phase-ramp function is arranged to translate the first holographic reconstruction;

blocking at least a portion of the first holographic reconstruction using a mask, wherein the mask is arranged to block the non-picture area in an absence of the phase-ramp function; and measuring a property of a boundary between the picture area and the non-picture area.

* * * * *